United States Patent [19]

Harlan et al.

[11] 4,084,292
[45] Apr. 18, 1978

[54] DRUM SKINNER

[75] Inventors: Martin L. Harlan; John A. Krause, both of Grand Rapids; Ronald L. Brooks, Lowell, all of Mich.

[73] Assignee: Wolverine World Wide, Inc., Rockford, Mich.

[21] Appl. No.: 736,710

[22] Filed: Oct. 29, 1976

[51] Int. Cl.² ............................................. A22C 17/12
[52] U.S. Cl. ............................................. 17/50; 17/21
[58] Field of Search ................ 17/21, 50, 17, 62; 99/587, 589

[56] References Cited

U.S. PATENT DOCUMENTS

| 1,588,489 | 9/1951 | Duggan | 17/62 |
|---|---|---|---|
| 1,790,592 | 1/1931 | Morrison | 99/589 |
| 1,867,133 | 7/1932 | Bissem | 17/62 |
| 1,975,044 | 9/1934 | Kelly | 99/589 |
| 2,149,022 | 2/1939 | Hunt | 17/62 |
| 2,522,728 | 9/1950 | Townsend | 17/21 |
| 2,649,881 | 8/1953 | Runnbees, Jr. et al. | 17/21 |
| 2,655,688 | 10/1953 | Hube | 17/62 |
| 2,681,675 | 6/1954 | Burch | 17/21 |
| 2,715,427 | 8/1955 | Townsend | 17/21 |
| 3,298,414 | 1/1967 | Runnells, Jr. | 99/589 |
| 3,308,502 | 3/1967 | Bedname et al. | 17/21 |
| 3,310,085 | 3/1967 | Burch | 99/589 |
| 3,424,217 | 1/1969 | Burch | 17/21 |
| 3,504,721 | 4/1970 | Townsend | 99/589 |
| 3,737,949 | 6/1973 | Davis | 17/21 |
| 3,744,407 | 7/1973 | Harlan et al. | 99/589 |
| 3,835,502 | 9/1974 | Thompson et al. | 17/21 |
| 4,025,986 | 5/1977 | Koken | 17/21 |

FOREIGN PATENT DOCUMENTS

| 46,678 | 3/1966 | Germany | 17/21 |
|---|---|---|---|
| 84,437 | 9/1971 | Germany | 17/21 |
| 84,135 | 8/1976 | Germany | 17/21 |

Primary Examiner—Louis G. Mancene
Assistant Examiner—Paul J. Hirsch
Attorney, Agent, or Firm—Price, Heneveld, Huizenga & Cooper

[57] ABSTRACT

A hog carcass skinning apparatus is disclosed including a rotatably mounted and generally vertically positioned drum having an axially oriented ditch opening in its periphery. A clamp is carried by the drum in the ditch for clamping an edge flap of skin on the hog carcass. A floating skin scraper is positioned adjacent the ditch, and a skin flap gripping and infeeding device is positioned in the ditch for infeeding the edge flap into the ditch to allow clamping thereof so that upon rotation of the drum, the carcass is caused to rotate and the skin is scraped off the carcass by the scraper.

62 Claims, 29 Drawing Figures

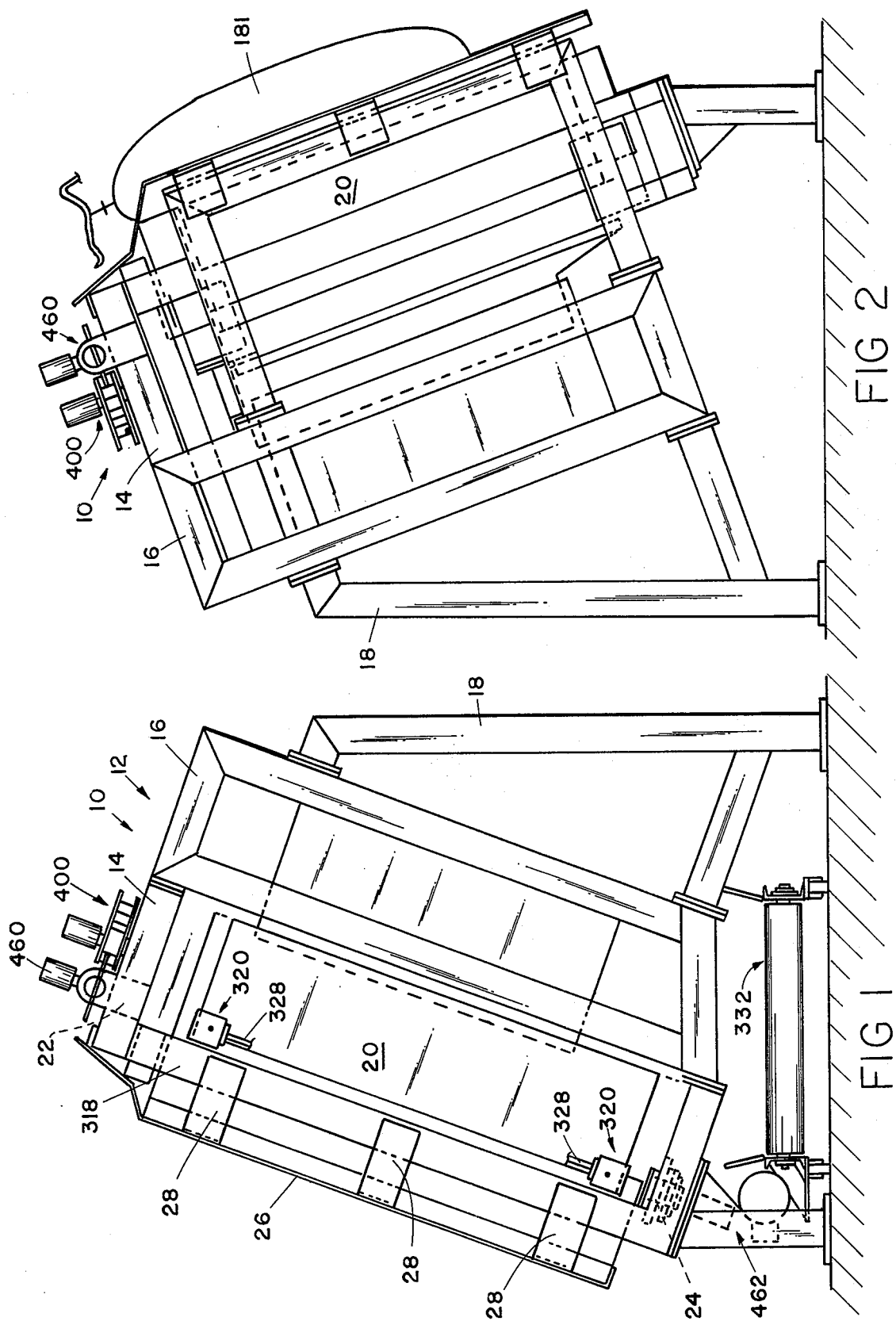

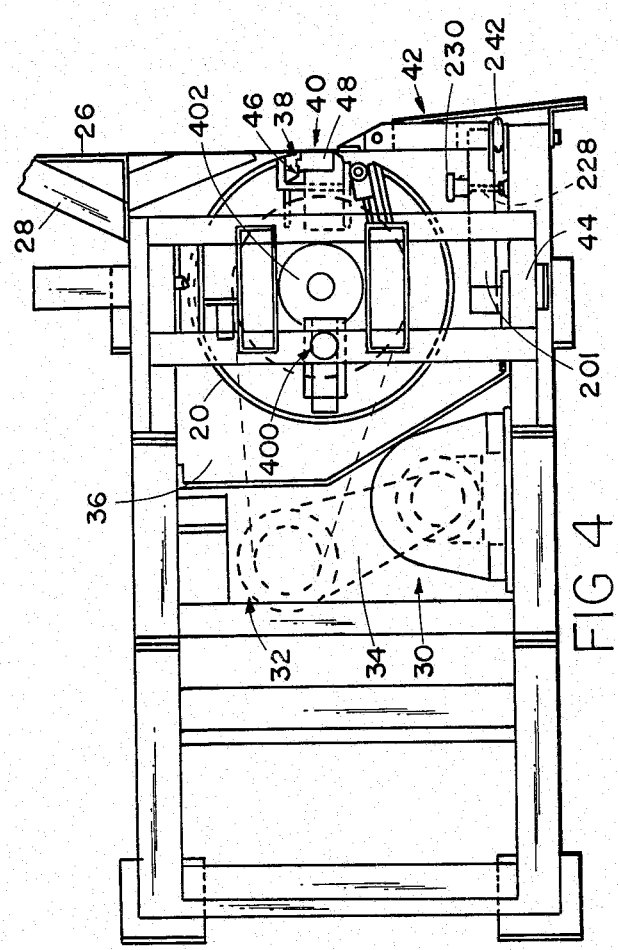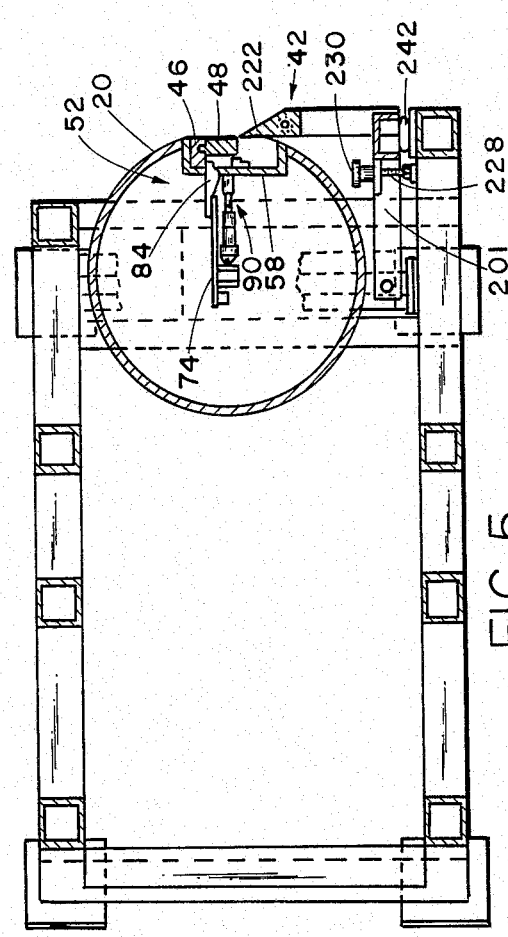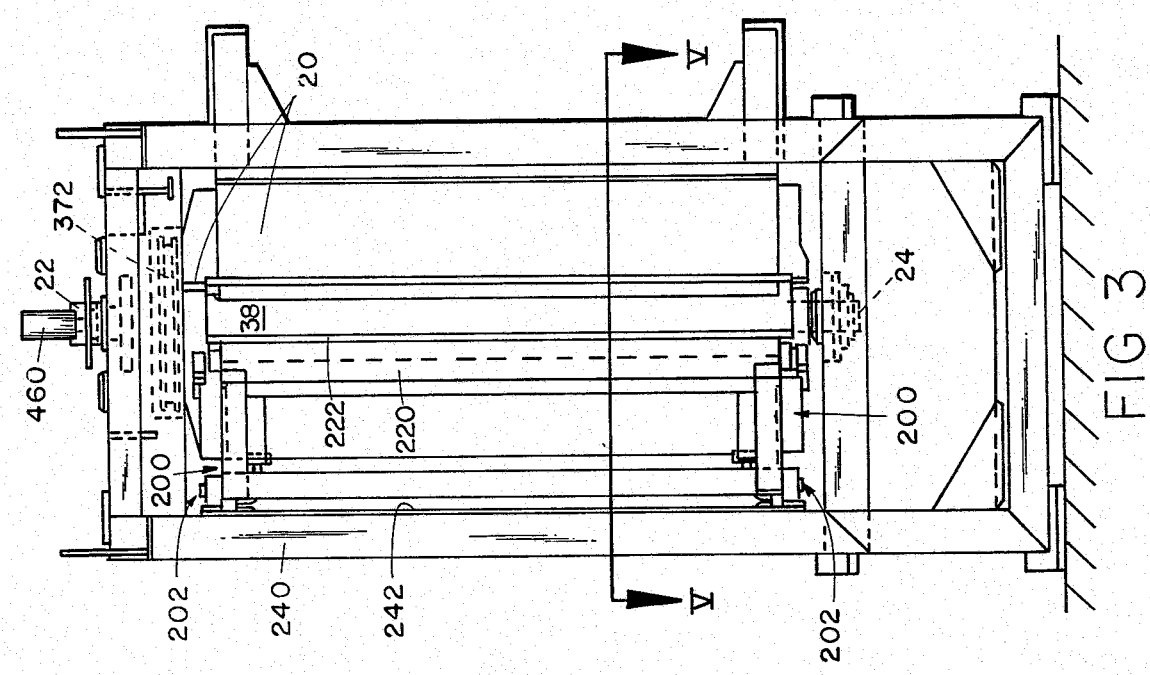

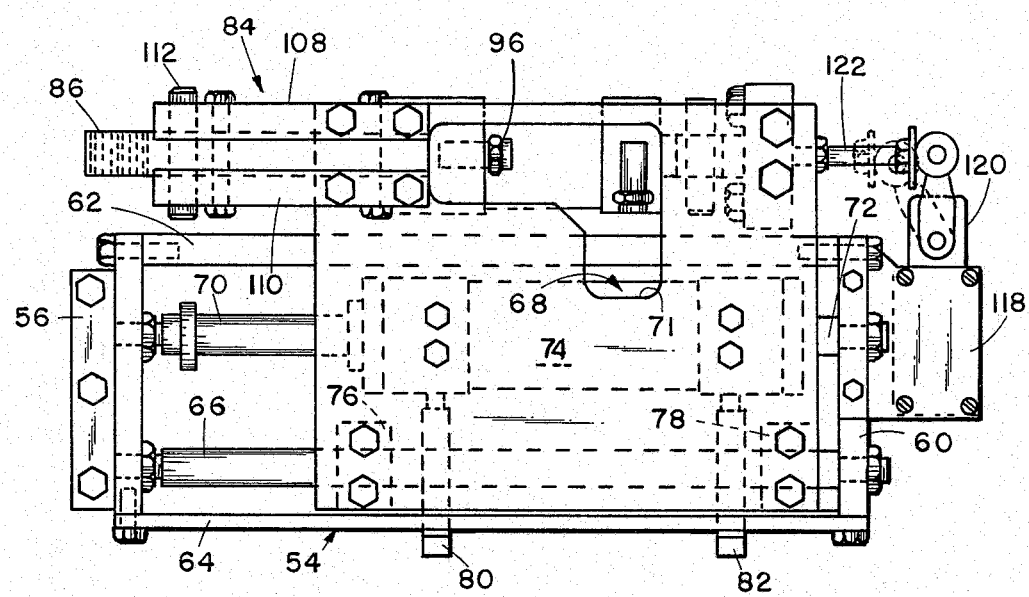
FIG 8
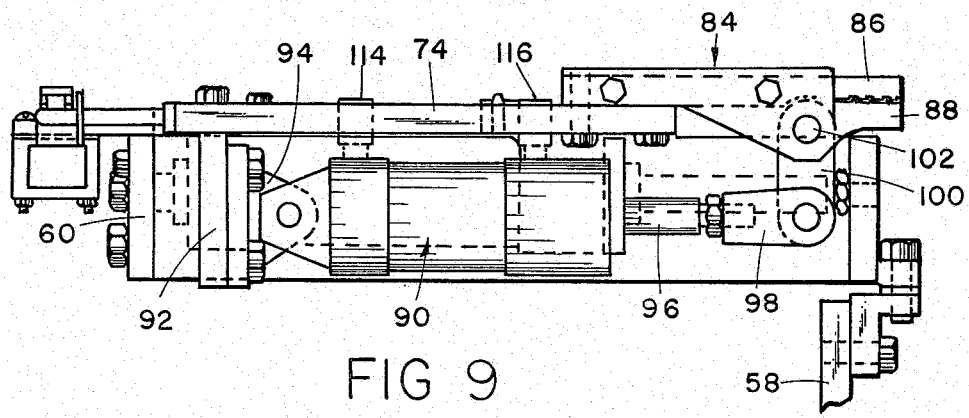
FIG 9
FIG 10

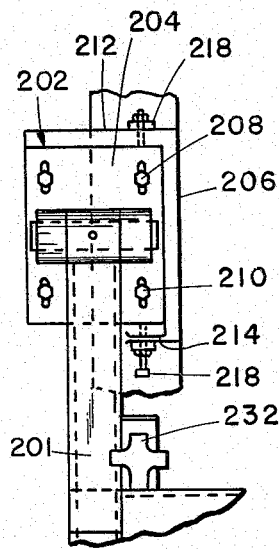
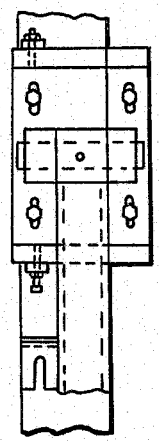
FIG 12
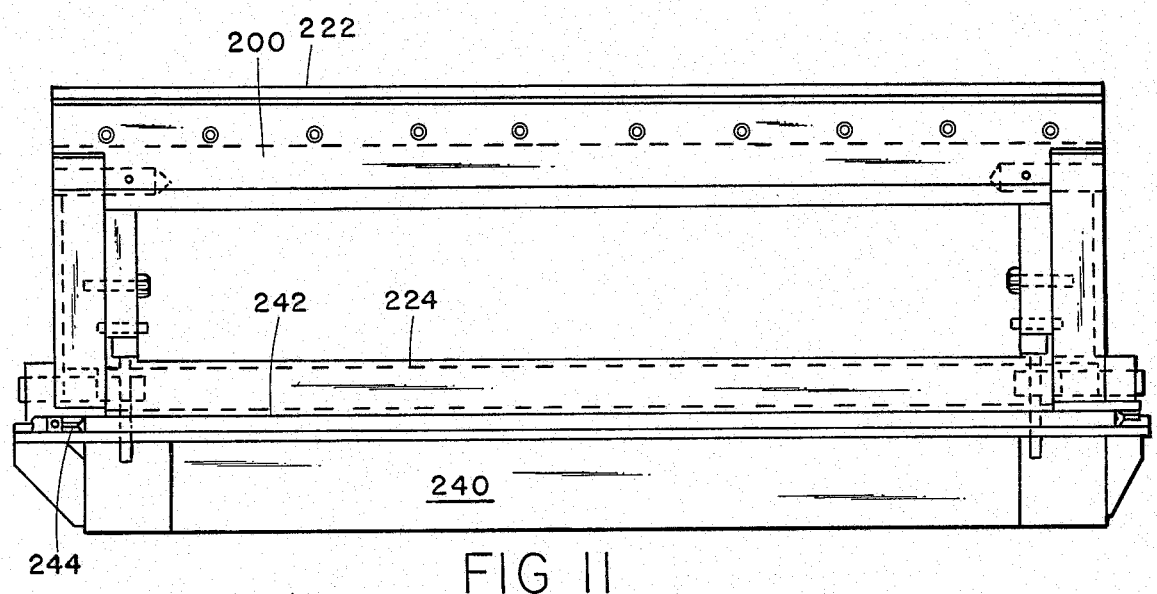
FIG 11
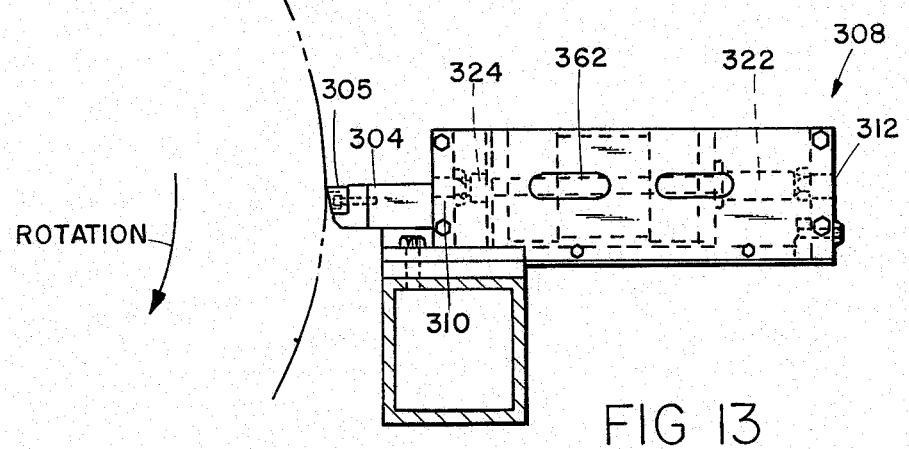
ROTATION
FIG 13

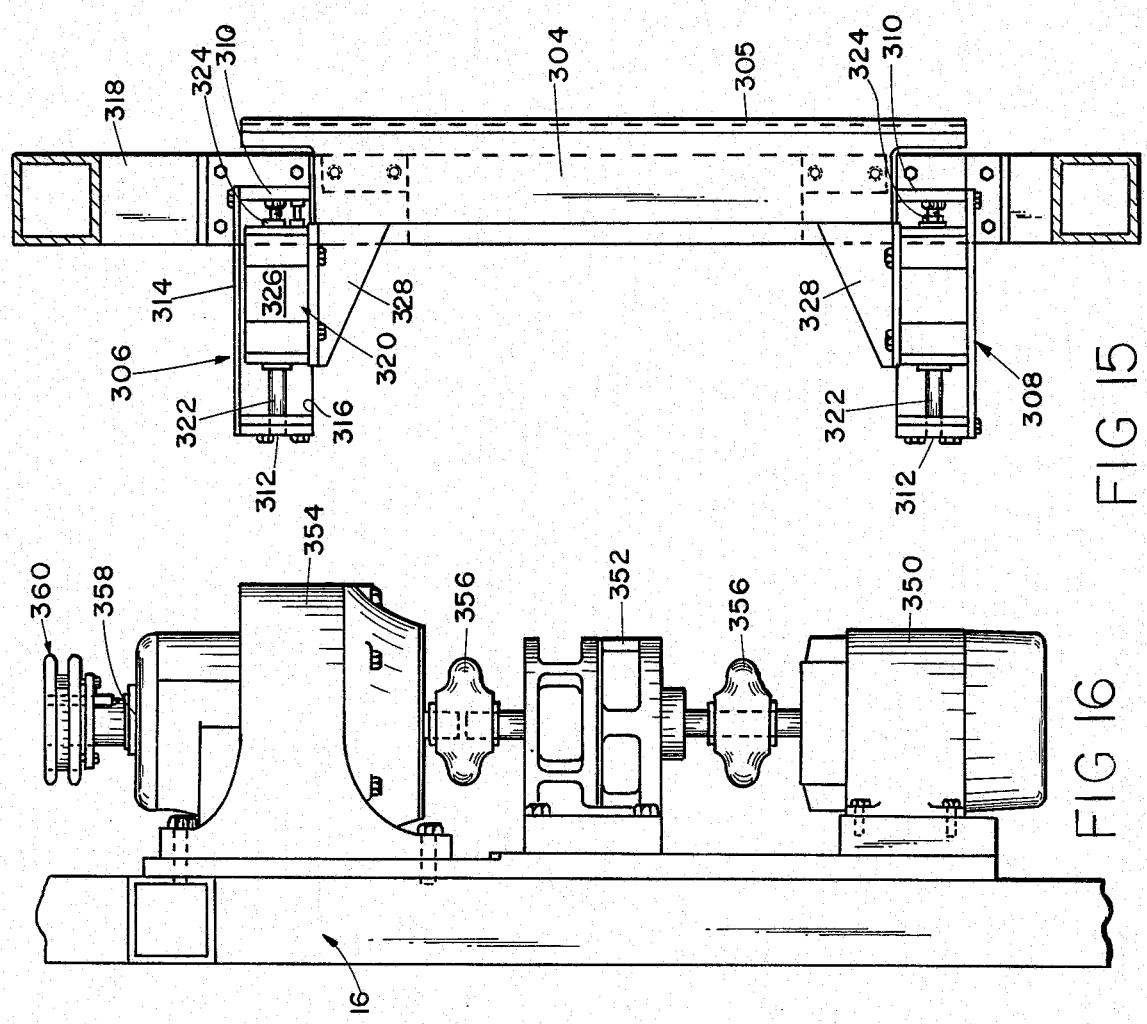
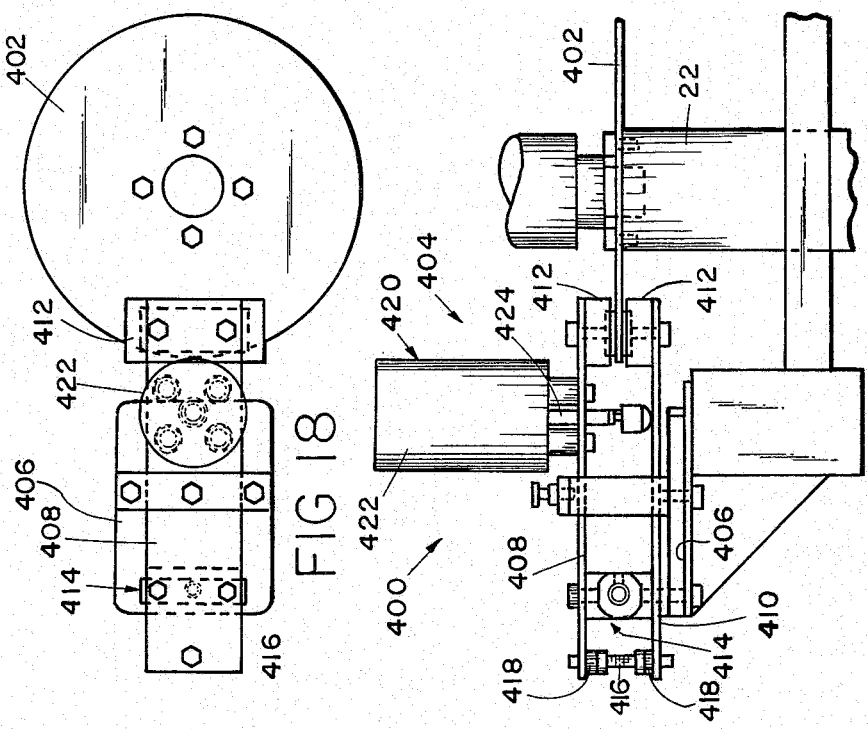
FIG 15
FIG 16
FIG 18
FIG 19

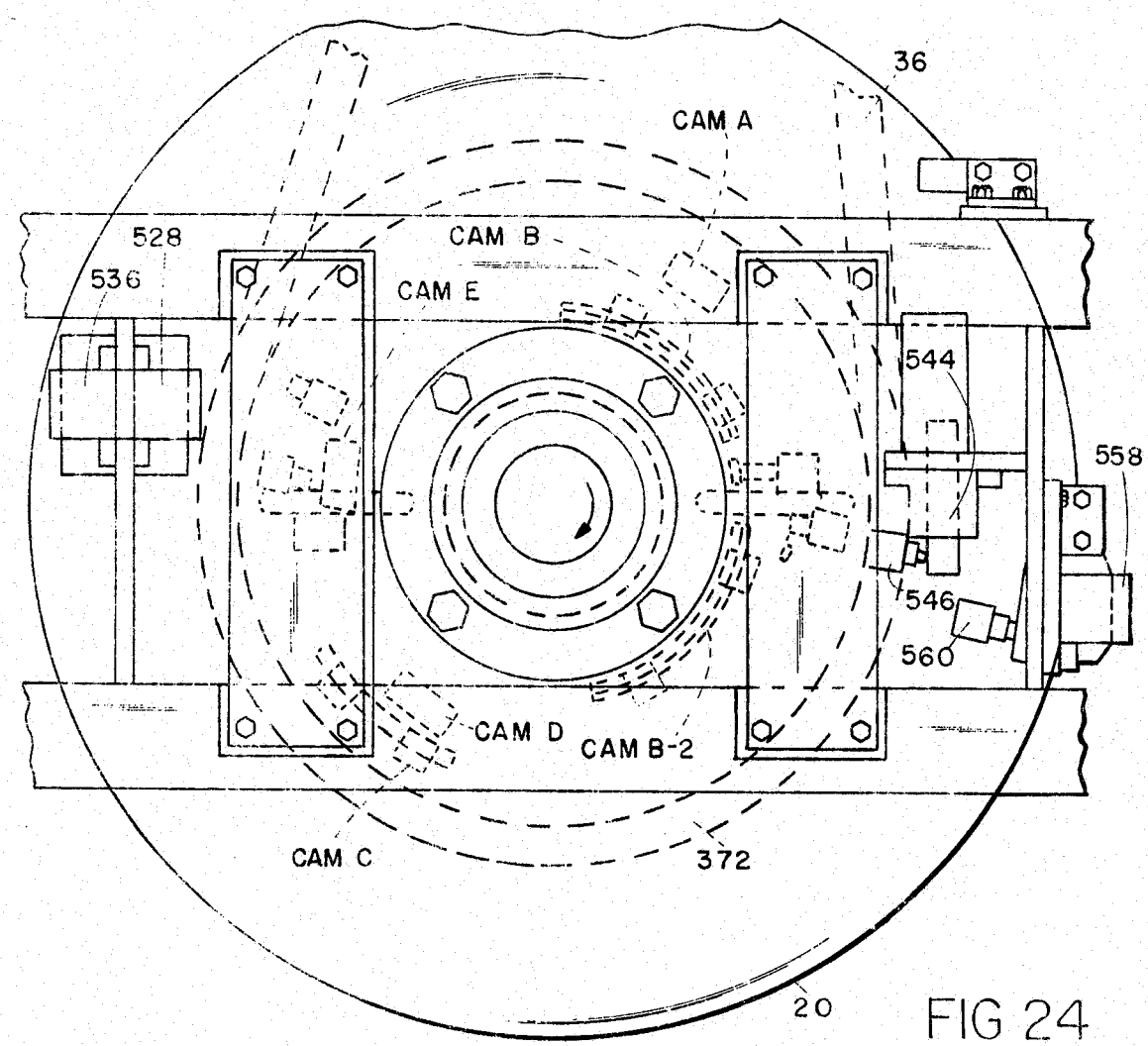
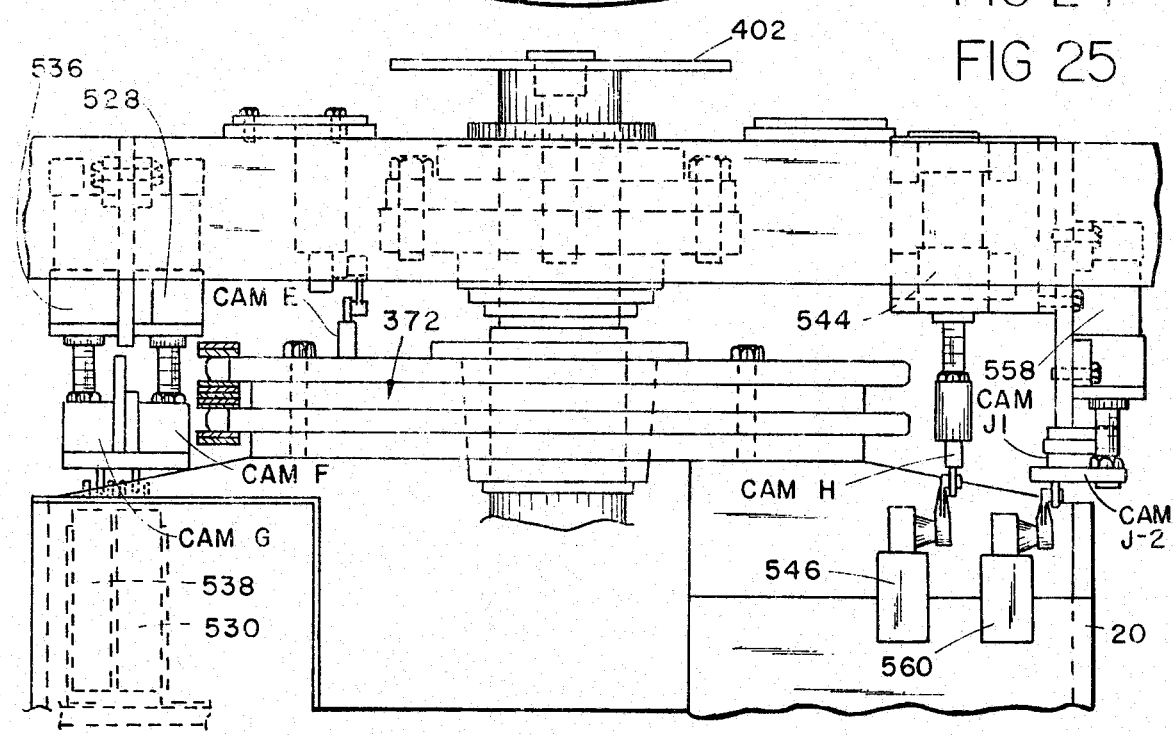
FIG 24
FIG 25

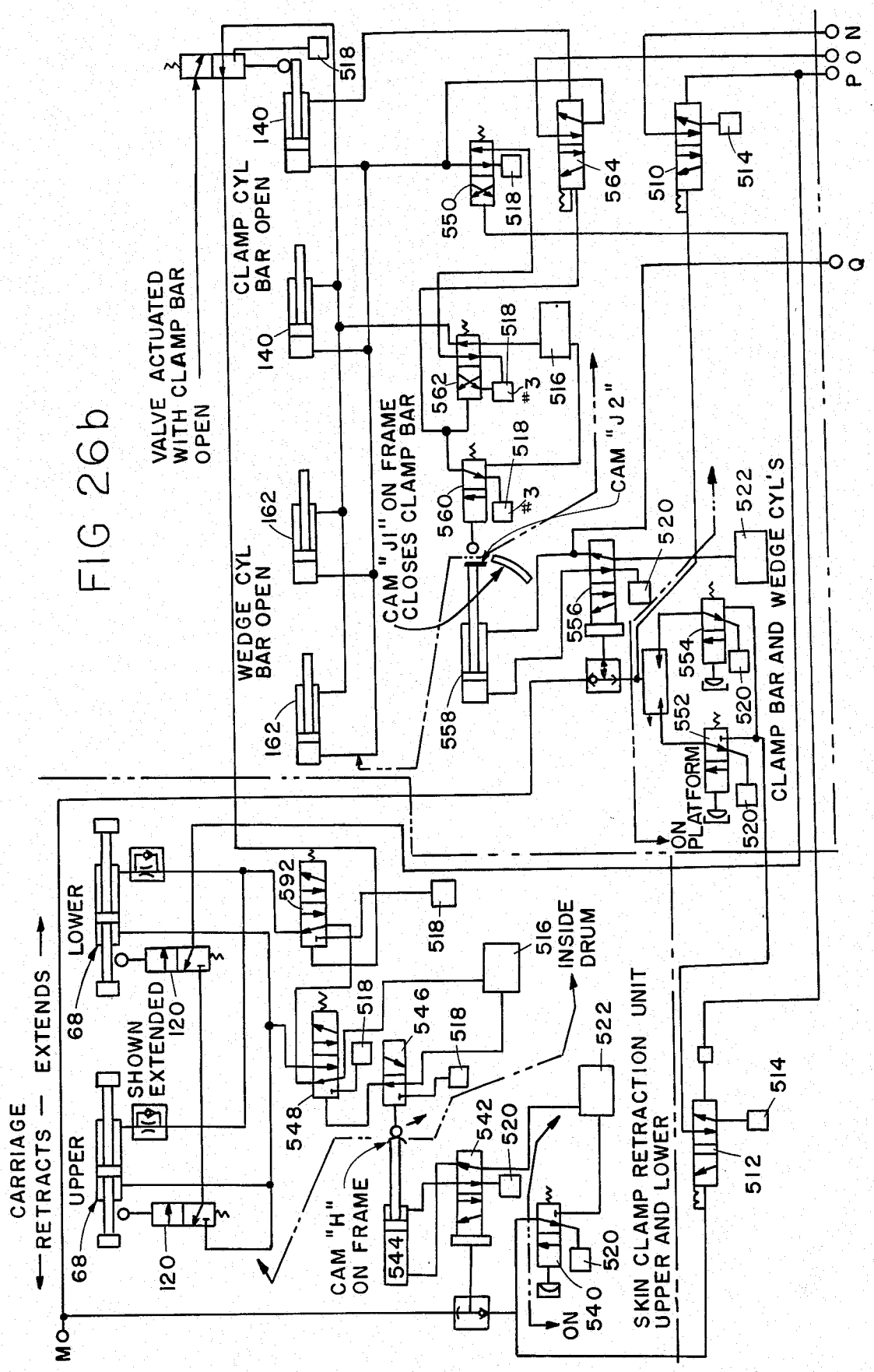

DRUM SKINNER

BACKGROUND OF THE INVENTION

This invention relates to the skinning of animals and more particularly, to a unique hog skinning apparatus and method.

Heretofore, the processing of hogs at a packing house has typically included the steps of killing and bleeding the hogs which are hung by their rear hocks in a head down position. Following the killing and bleeding, the hogs have usually been scalded, dehaired and singed. These steps are required for sanitary reasons prior to the actual butchering of the hogs. After these steps, the hogs have typically been split through their backbone or fat back area to form two equal halves or "hog sides", but in some instances without splitting the hide so that the entire skin would be kept intact. The main meat and bone portions were then removed from the hog sides. The residual meat, bacon, and fat are removed from the skin during the subsequent skinning process.

The skin of the hogs, when properly treated and if removed without damage, provides excellent material for shoes, purses, belts, and a wide variety of other goods. The packing or slaughterhouse owners, however, are not overly concerned with the condition of the skin but are more concerned with the complete removal of the valuable bacon.

Hog skinning machines have been developed for placement in the production line which remove the skin of the hog sides and optimize bacon yield without damage or with only minimal damage to the skin. Examples of such skinning machines may be found in commonly owned U.S. Pat. No. 3,744,407, issued July 10, 1973, in the name of Martin L. Harlan et al and entitled UNIVERSAL SINGLE SIDE SKINNING MACHINE and U.S. Pat. No. 3,310,085, issued Mar. 21, 1967, in the name of Paul F. Burch and entitled SKINNING MACHINE.

Machines of the type disclosed and discussed in the aforementioned U.S. patents, typically include a horizontally positioned, rotatable cylinder or drum having a longitudinally extending ditch within which the edge of the hog skin on a hog side is clamped. A skinning blade is positioned radially adjacent the cylinder periphery and functions to cut the meat, fat, and bacon from the skin as the cylinder rotates. These machines function quite effectively to remove the valuable bacon from the skin without damaging the skin of each hog side. However, these machines are incapable of removing the skin from the hog sides prior to removal of the meat and bone portions. These machines have also required sharp skinning blades to cut the skin from the meat.

Attempts have been made to develop apparatus capable of removing the skin from the hog carcass itself prior to cutting the hog into two halves at the fat back area. For example, German Patent 84,135 entitled VERTICAL DESIGN OF MACHINE FOR SKINNING HOGS, issued Aug. 20, 1971, in the name of Paul Pfretzschner et al. discloses an apparatus of removing the skin from a hog carcass suspended on a conveyor by the hog's rear hocks. The apparatus includes a drum supported on a frame in a substantially vertical position. The drum includes a longitudinally extending ditch within which a clamping apparatus is positioned. A skinning blade is mounted on a frame adjacent the periphery of the drum. In use, an edge of the hog skin, after preliminary cutting, is manually laid in the open ditch of the drum and clamped therein. As the drum rotates, the hog also rotates and the skinning blade slices the skin from the hog carcass.

It has been found, however, that the machine of the type disclosed in the aforementioned German Patent suffers from deficiencies relating to sanitation capability, to safety of operation to workmen, to the clamping action, to the positioning of the skin flap within the ditch, and to the control of the skinning blade, thus preventing it from being a useful, practical machine capable of meeting sanitation and labor safety standards.

Because the drum and ditch are generally vertically oriented on the German machine, it is rather difficult and dangerous to manually place the skin flap in the ditch for clamping, as opposed to the horizontal hog side skinner where the flap will lay down into the ditch. Also the vertical skin flap tends to be wrinkled diagonally because of its orientation. Such a wrinkle, when clamped, prevents effective clamping of the skin and also causes the blade to cut through the skin and ruin it as the skinning proceeds.

SUMMARY OF THE INVENTION

In accordance with the present invention, a unique drum skinner is provided whereby the hog skin with retained hair still on it can be removed directly and rapidly from a hog carcass after killing and bleeding of the hog, while it is suspended by its rear hocks, eliminating the need for the extra dehairing or singeing steps and also providing a high yield of the valuable bacon without damage to the skin. Essentially, the hog carcass skinning apparatus includes a carcass-abutting and slide surface, a drum rotatably mounted adjacent the carcass-abutting and slide surface and having an axially oriented ditch opening through its periphery, means for clamping at the ditch an edge flap of the skin on a hog carcass so suspended head down by its rear hocks, a floating skin scraper positioned adjacent the ditch, and extensible-retractable skin flap gripping and infeeding means in the ditch for gripping and infeeding the edge flap into the ditch and clamp for safe, effective clamping thereof by the clamping means. Upon rotation of the drum, the carcass rotates on the abutting and slide surface and the skin is scraped off the carcass by the scraper. The unique skin flap gripping and infeeding means holds the skin flap in a flattened, unwrinkled condition. This enables effective clamping over the length of the flap, and forestalls skin damage by the scraper.

Wedging means are provided for greatly increasing the clamping force on the edge flap of skin within the ditch over that heretofore provided. Provision is made for controlling the pressure and angle of the scraper on the skin, permitting the scraper to float and to thereby control the scraping action for optimum yield as the drum rotates. Further, provision may be made for stripping the skin from the drum at the completion of the skinning operation. A fluid control system is provided for selectively actuating the infeeding means, activating the clamp and wedge means, for actuating the drum drive means, the stripper means, and for controlling the pressure exerted on the scraper during rotation of the drum.

The unique apparatus in accordance with the present invention is capable of sanitarily removing the skin including the hair and bristles from the hog carcass while the carcass is suspended from its rear hocks. The apparatus is capable of varying the pressure of the scraper blade as a function of the position of the drum and therefore vary the pressure exerted and the scraper angle from the belly area to the fat back area and back to the belly area of the hog as it is rotated by the drum, thereby optimizing bacon yields without damaging the skin. The apparatus further provides improved clamping means capable of holding the skin flap during the skinning operation as well as providing means for safely retracting and infeeding the skin flap into the ditch prior to clamping thereof.

The unique apparatus in accordance with the present invention increases the production capabilities of existing packing plants by decreasing the steps required during the slaughtering process. The dehairing or singeing and scalding steps may be eliminated, the amount of preliminary cutting or stripping of the skin from the hog is decreased, resulting in decreased man hours expended and therefore an increase in plant efficiency. And even though a far more powerful clamping action is applied, this is done without danger to the operator's hands.

BRIEF DESCRIPTION OF THE DRAWINGS

FIG. 1 is a right side elevational view of the drum skinner in accordance with the present invention;

FIG. 2 is a left side elevational view of the drum skinner;

FIG. 3 is a front elevational view of the drum skinner;

FIG. 4 is a top plan view of the drum skinner;

FIG. 5 is a cross-sectional view taken generally along line V—V of FIG. 4;

FIG. 8 is an enlarged, side elevational view of the extensible and retractable skin flap gripping and infeeding means;

FIG. 9 is a top plan view of the infeeding means of FIG. 8;

FIG. 10 is a fragmentary, top plan view of the skinner showing the scraper subassembly;

FIG. 11 is a fragmentary, front elevational view of the scraper subassembly;

FIG. 12 is a fragmentary, side elevational view of the scraper subassembly;

FIG. 13 is a fragmentary, partially sectioned, top plan view of the skinner showing the stripper subassembly;

FIG. 15 is a fragmentary, side elevational view of the stripper;

FIG. 16 is a side elevational view of the main drive mechanism;

FIG. 18 is a partial, top plan view showing the drum brake mechanism;

FIG. 19 is a side elevational view of the drum brake mechanism;

FIG. 24 is a top plan view of the skinner showing a portion of the control system including some of the valves and cams;

FIG. 25 is a fragmentary, side elevational view showing the portion of the control system illustrated in FIG. 24;

DETAILED DESCRIPTION OF THE PREFERRED EMBODIMENT

Overall Apparatus

Figure 6:
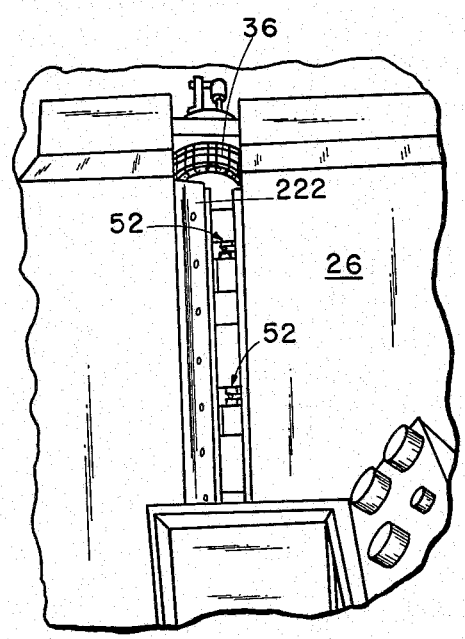
FIG. 6 is a fragmentary, enlarged front elevational view of the drum skinner.

The preferred embodiment of the drum skinner in accordance with the present invention is illustrated in the drawings and generally designated 10. As best seen in FIGS. 1, 2, 3 and 4, the skinner 10 includes a support frame 12 having a drum support section 14, a drive support section 16 and a rear support 18. A drum 20 having outwardly extending axles 22, 24 is rotatably mounted on section 14 of the frame 12. It is presently preferred that the drum be mounted approximately 20° from vertical, although this angle can be varied to suit the size and weight of the hogs processed, etc. Secured to the forward portion of frame 14 is a carcass-abutting and slide surface or plate 26. The plate 26 is secured to the frame by suitable gussets or cross members 28 (FIGS. 1 and 4)

The drive support section 16 of the frame 12 supports a main drive subassembly 30 and a jack shaft assembly 32. As more fully explained below, the drum 20 is rotated by the drive assembly 30 through chains or flexible drive transmitting means 34, 36 illustrated schematically in FIG. 4.

The drum 20 includes a longitudinally or axially extending ditch 38 which opens through the periphery of the drum. Positioned within the ditch is a clamp means generally designated 40 including an elongated female clamp bar 46 and an elongated male clamp bar 48 which is movable within the ditch 38, as will be more fully described below. A scraper subassembly 42 is pivotally mounted on a cross member 44 of section 14 of the support frame. In one existing embodiment, the drum has a diameter of approximately 31 inches and is rotated at a speed of 11.3 rpm.

Skin Flap Gripping And Infeeding Means

Figure 7:
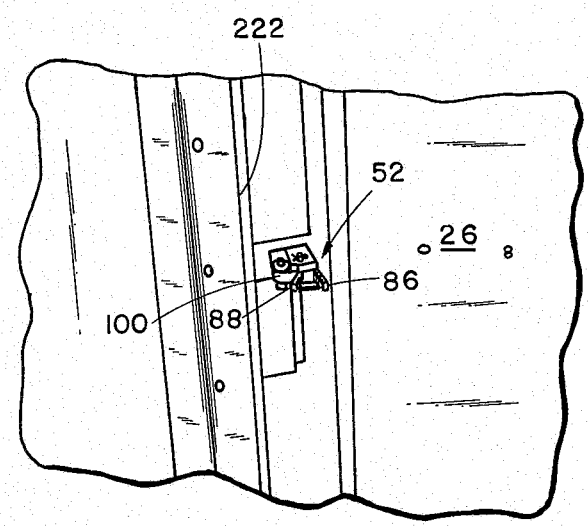
FIG. 7 is an enlarged, fragmentary front view showing a single extensible and retractable skin flap gripping and infeeding means.

As best seen in FIGS. 5, 6 and 7, a unique skin flap gripping and infeeding means 52 are provided for infeeding a skin flap of the hog carcass into the ditch prior to closing of the clamp means 40. In the presently preferred embodiment, as seen in FIG. 6, a pair of longitudinally spaced infeeding means 52 are provided. With reference to FIGS. 8 and 9, each infeeding means includes an extensible and retractable carriage subassembly 54. The carriage subassembly includes a front cylinder support plate 56 secured to the base portion 58 of the ditch 38 at an opening formed in the ditch (FIG. 6). A rear support plate 60 is connected to the front support plate by a pair of spaced, parallel side plates 62, 64. Extending between the front support plate 56 and the rear support plate 60 is a guide rod 66. The guide rod 66 extends parallel to the side support plates. Also, extending between the front and rear support plates 56, 60 is a double rod, air cylinder subassembly 68 including a pair of oppositely extending, coaxial piston rods 70, 72. A carriage plate 74 is bolted to the cylinder 71 of the subassembly 68. A pair of longitudinally spaced guide rod bearings 76, 78 are also bolted to the underside of the carriage plate 74 and encircle the guide rod 66. The piston cylinder assembly 68 is preferably of a pneumatic type with actuating air being provided to the cylinder through conduits 80, 82. Selective pressurization of opposite ends of the air cylinder will result in sliding movement of the carriage plate 74 into and out of the ditch 38. Mounted on the upper surface of the carriage plate 74 is a gripping finger holder 84 to which is secured a fixed gripping finger 86. Mounted to the finger holder 84 below and superimposable with the fixed finger 86 is a pivotable finger 88. A single stem piston cylinder assembly 90 is also secured to the bottom of the plate 74. The rear end of the piston cylinder assembly 90 is secured to a plate 92 extending down from the carriage plate 74 at an eye bracket 94. The piston rod 96 of the piston cylinder assembly 90 is connected to the lower finger 88 through a rod clevis 98 and a link 100 which is connected directly to the lower finger 88 and pivots about pivot pin 102 extending through the finger mount 84.

As best seen in FIG. 8, the upper and lower finger mount 84 includes a pair of spaced finger guide plates 108, 110. The upper finger 86 is positioned between the guide plates and the lower finger 88 is pivotally mounted to the guide plates by pin 102 extending between the plates. Air is supplied to the finger actuating cylinder assembly 90 through conduits 114, 116. Mounted to the rear plate 60 is a valve bracket 118 which supports a valve 120. An actuator rod 122 is secured to the rear of the carriage plate 74 in line with the finger mount 84. Rod 122 is dimensioned to trip the valve 120 when the carriage returns to its rearmost position at which the fingers 86, 88 are closed and withdrawn into the ditch. The valve 120 forms part of the pneumatic control system which will be more fully described below in connection with FIGS. 26a-26c.

Clamp Means And Wedge Means

The clamp means 40 is best seen in FIGS. 20, 21, 22 and 23. As shown therein, the clamp means includes a pair of axially spaced actuator assemblies positioned adjacent the upper and lower ends of elongated male clamp bar 48. The upper and lower actuators are essentially the same and therefore like numerals will be employed to designate like parts illustrated in FIGS. 20–23. The male clamp bar 48 is secured to one end of a bellcrank 130 which includes a wedge bar arm 132 and a clamp bar arm 134. The bellcrank 130 is rotatably or pivotally mounted about the longitudinal axis of the drum 20 by an outer sleeve 136 which rotates on an inner sleeve 138. A piston cylinder assembly 140 is provided to rotate the bellcrank 130 and thereby move the male clamp bar 48 into and out of engagement with the female clamp bar 46. One end of the piston cylinder assembly 140 is pivotally secured at an eye bracket 142 to a plate 144 positioned within the drum 20. The piston rod 146 is pivotally connected to the outer end of the clamp bar arm 134 through a clevis 148 and pivot pin 150. As a result, upon retraction of the piston rod 146 the bellcrank will rotate about the inner sleeve 138 and the male clamp bar 48 will move about the ditch and out of engagement with the female clamp bar 46. Upon extension of the piston rod 146, the clamp bar 48 will be positioned generally abutting the female clamp bar 46.

The female clamp bar 46 has an elongated, flat based channel 159 opening into the ditch. The male clamp bar has an elongated flat faced protrusion 161 which is configured to extend into the channel 159 to clamp the skin flap therein.

Figure 22:
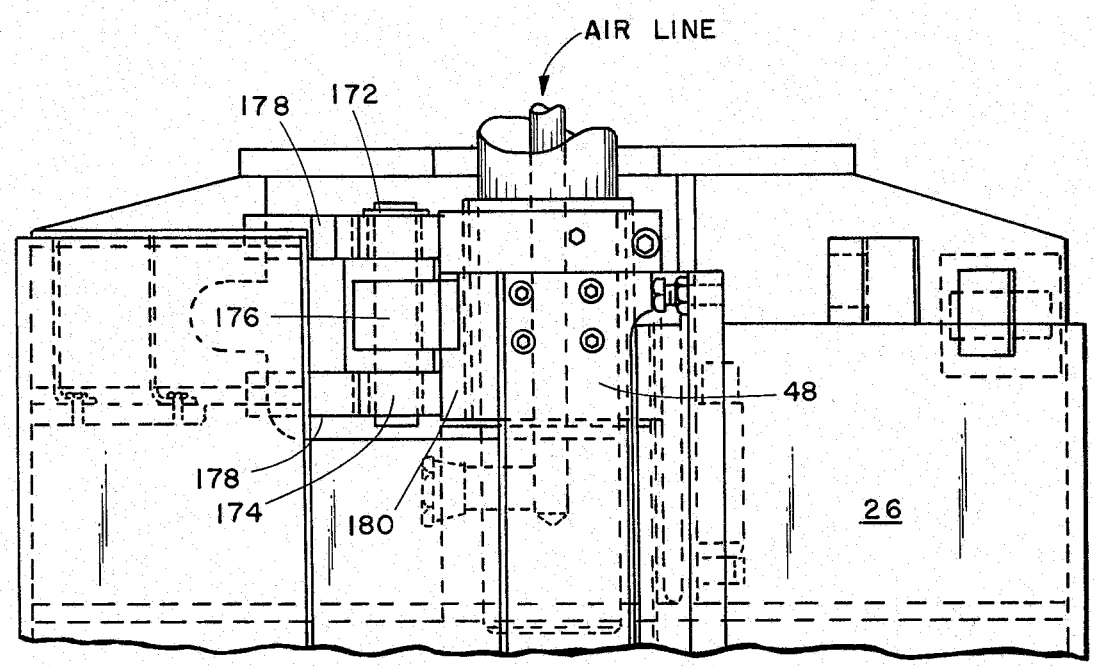
FIG. 22 is a fragmentary, front elevational view showing the upper clamp means and wedge means.
Figure 23:
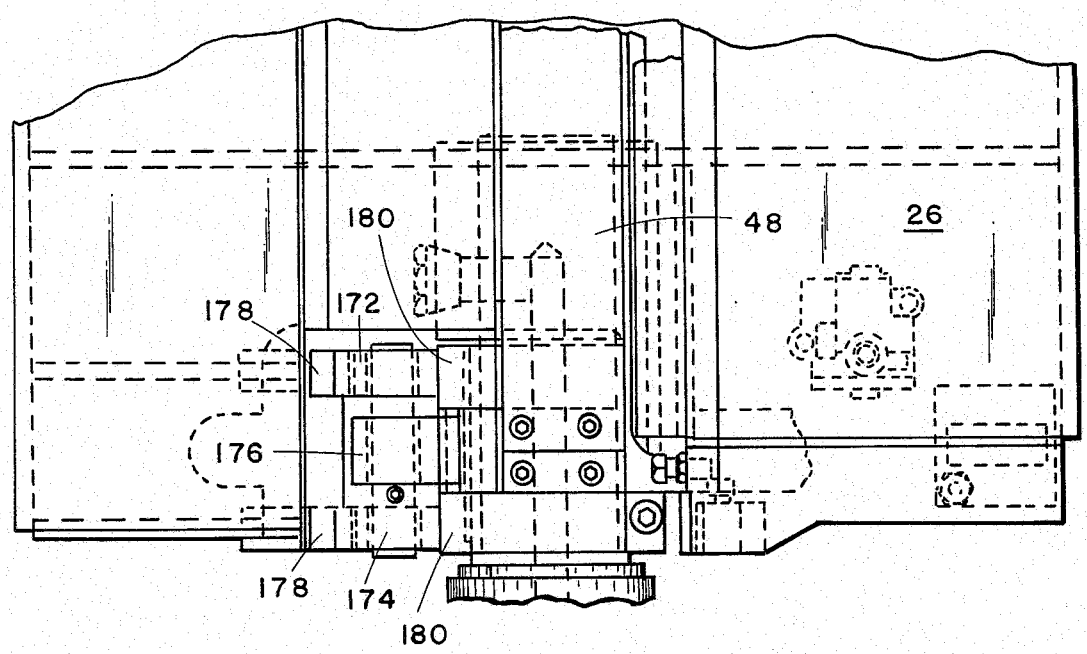
FIG. 23 is a fragmentary, front elevational view showing the lower clamp means and wedge means.

The clamping pressures obtainable from a single piston cylinder and bellcrank type lever arm assembly are not sufficient to insure that the relatively thin skin flap will be retained within the ditch during the skinning operation. It will be realized that a tremendous pulling stress is applied to the skin of the large carcass. The clamping force is manifoldly increased by a special wedging means 160 provided. The wedging means 160 includes a piston cylinder assembly 162. The cylinder of the assembly 162 is pivotally mounted within the drum 20 adjacent its forward end by a plate 164 and bushing mount 166. A piston rod 168 extending from the cylinder includes a wedging roller assembly 170. As best seen in FIGS. 22 and 23, the wedging roller assembly includes a pair of spaced upper and lower rollers 172, 174, respectively, and intermediate roller 176. A camming wear plate 178 extends from a point adjacent the periphery of the drum 20 inwardly along a cord or secant of the drum. The camming plates 178 are mounted relative to the bellcrank wedge bar arm 132 so that upon actuation of the piston cylinder assembly 162, the rollers 172, 174 and 176 will ride against a wear plate 180 welded or otherwise suitably secured to a lateral edge of the bellcrank arm 132. Therefore, actuation of piston cylinder assembly 140 rotates or pivots the male clamp bar towards the female clamp bar and actuation of the piston cylinder assembly 162 wedges and therefore greatly increases the clamping force existing between the clamp bars 46, 48.

When the drum skinner in accordance with the present invention is placed in a production line, a pig or hog designated 181 and illustrated schematically in FIG. 2, will be positioned in front of the ditch, resting on the plate 26 and suspended from its hocks by a rotary hook. The hog is suspended so that it will rest on surface 26, yet freely rotate about its longitudinal centerline. The infeed mechanisms 52, the clamp means 40 and the wedge means 160 function to easily and effectively place a skin flap from a hog carcass within the ditch of the drum. Typically, the hog 181 (FIG. 2) will be moved down the production line suspended from its rear hocks. The drum 20 is angled from vertical so that the weight of the hog carcass will keep it against the machine. The angling should not be so severe that the hog will not freely rotate as the skin is pulled around the drum. The hog will have been killed and bled and preliminary trimming adjacent the rear legs and the head will have been manually performed. A skin flap is provided by slitting the skin longitudinally of the hog along the teat strip. The skin is stripped back to provide sufficient skin to insert within the ditch of the skinner. At the beginning of the skinning operation, the upper and lower gripping and infeeding fingers of assemblies 52 will be positioned as in FIG. 6. The fingers will be extending from the ditch and will be open. The operator will then manually place the flap between the fingers and actuate the retraction cylinders 68 of each carriage assembly and the finger clamping cylinders 90. The skin flap will thereby be clamped and gripped by the fingers 86, 88 and withdrawn into the ditch. The force applied by these grippers is small, being only large enough to pull the flap of skin into the ditch. Thus, even if a workman's finger should get caught, the bruise would not be serious. Next, the control system will actuate piston cylinder assembly 140, moving the clamp bar 48 towards the female clamp bar 46. Also, the piston cylinder assembly 162 of the wedge means will be actuated, driving the roller assembly 170 against the lateral edge 180 of the wedge bar arm 132, thereby substantially increasing the clamping pressure between the clamp members 46, 48 and securely holding the skin flap within the ditch. This clamping and wedging is done without the operator's hands being in the vicinity.

It is preferred that the upper and lower fingers 86, 88 of each infeeding mechanism be fabricated from a frangible material, preferably a polymeric, i.e. plastic material such as nylon. In the event of a malfunction of the retraction cylinders of the carriage assemblies, the male clamp bar will sever the gripping fingers 86, 88 upon closing and no damage will result to the bar itself. The infeeding mechanism 52 permits the skin flap to be positioned within the ditch and held for actuation of the clamp and wedge means. This feature substantially reduces or eliminates the danger of injury to an operator and also insures that the skin flap be properly positioned within the ditch without wrinkling, i.e. it will be properly stretched along the longitudinal length of the ditch. It is presently preferred that two infeeding mechanisms 52 be provided. One or more infeeding mechanisms may, however, be provided to insure that the skin flap is held properly within the ditch prior to actuation of the clamp means and wedge means.

SKIN SCRAPER SUBASSEMBLY

The scraper subassembly 42 is best seen in FIGS. 4, 10, 11 and 12. As seen therein, the subassembly 42 includes a pair of vertically spaced, generally L-shaped members 200. The end of one leg 201 of each of the L-shaped members 200 is pivotally secured to the frame 12 at an adjustable pivot base subassembly 202. As best seen in FIG. 12, the adjustable pivot base subassembly 202 includes a plate 204 which is bolted to a frame member 206. The bolts 208 securing this plate to the frame member are received in longitudinal slots 210. A pair of plates 212, 214 are positioned spaced from the transverse edges of the plate 204. Extending through these plates 212, 214 are adjustment bolts 218. As will be apparent, turning of the adjustment bolts will position the plate 204 relative to the side plates 212, 214 and thereby position the free end of leg 203 of member 200 relative to the drum periphery. The L-shaped members 200 of the scraper frame are connected by an upper blade holder 220 which carries a scraper blade 222. The scraper blade 222 has a dull, blunt or non-sharp leading edge. Due to the nature of operation of the drum skinner and the floating action of the blade, as described below, the blade 222 need not have a razor sharp edge, as required with horizontal drum, hog side skinners. The skin is not cut from the carcass as is the case with the horizontal drum hog side skinners. Rather, the blade 222 scrapes the skin from the carcass. The blade exerts a varying pressure on the skin during the skinning operation which in conjunction with the varying angle of the blade separates the skin from the carcass. The problem of having to constantly check sharpness of the blade and having to hone the blade experienced with the knife blades used on horizontal drum skinners is not present.

It is presently preferred that the blade leading edge be rounded and have approximately a 1/64 inch radius. in the alternative, the leading edge could be flat with the upper and lower edges rounded to provide the dull blade.

A cross member 224 extends between the members 200 of the scraper frame at the junction of the legs of the L-shaped members. Suitable cross bracing 226 may also be employed to rigidify the scraper subassembly. An adjustment bolt 228 including a knobbed head 230 extends through a bracket plate 232 attached to the leg 201 of the frame. The lower end of the bolt is threadable through a threaded aperture formed in a portion of the skinner frame. A suitable lock nut 234 is also threaded on the lower end of the bolt 228. As seen in FIGS. 10 and 11, the adjustment bolts 228 are positioned adjacent each end of the scraper frame. As is apparent from FIGS. 4 and 10, the adjustment bolts 228 serve to set the minimum spacing between the scraper blade 222 and the periphery of the drum 20. The knobs limit the pivotal movement of the scraper frame towards the drum periphery.

Disposed between the cross member 224 and a frame member 240 is a resilient, pneumatic biasing means 242. The resilient biasing means 242 engages the cross member 224 of the scraper mount and biases the scraper a predetermined amount relative to the drum periphery. In the preferred construction, the resilient means 242 is an air bag formed from a length of fire type hose closed at one end and provided at its other end with a fill tube 244. By properly selecting the pressure within the hose 242, the pressure exerted on the skin by the scraper blade 222 may be controlled. Also, the angle which the scraper blade 222 assumes relative to the drum surface during the skinning operation may be controlled. The resilient biasing means results in the scraper blade having a floating action during the skinning operation depending upon the resistance applied to the scraper. Since the resistance to separation of the skin from the carcass varies over the carcass surface, the force which the blade exerts on the skin should vary to prevent damage to the skin and permit only limited or negligible removal of the fat forming bacon and residual meat products from the carcass as the skin is removed. The skin is relatively thin from the teat line towards the fat back area. At the fat back area, the skin is relatively thick and much less susceptible to tearing during the skinning operation. By properly selecting the pressure within the resilient pneumatic biasing means 242, tearing of the skin may be avoided and valuable meat products will not be removed from the hog carcass.

The floating skin scraper holds the skin to the drum as the hog carcass is rotated as a result of rotation of the drum. The skin is thinnest adjacent the teat area or belly area of the hog and therefore the blade should be positioned closest to the drum when the skin is being removed from this section. As the hog freely rotates in response to rotation of the drum, a thicker and tougher skin area is presented to the scraper blade adjacent and at the fat back area. As a result, the blade tends to pivot away from the drum periphery and scrape deeper into the hog carcass underneath the skin surface. Best results are obtained if the biasing force applied to the floating scraper is purposely varied by increasing and decreasing the pressure in the resilient air bag 242. Specifically, the pressure is higher along the belly areas and lower at the fat back areas. Presently, it has been found that an initial pressure of approximately 50 psi in the resilient means along the teat strip of the belly, decreasing to 0 psi as the fat back area is presented to the scraper blade and then increasing to 80 psi as the scraper is presented to the second belly area, provides excellent results. The control system for varying the pressure within the hose or air bag 242 will be described below in connection with FIGS. 26a–26c.

STRIPPER MEANS

As seen in FIGS. 1, 13, 14 and 15, the hog skinner can be provided with a stripper subassembly generally designated 300 and which is secured to the frame section 14. The stripper serves to assure removal of the skin from the drum after removal from the carcass. Stripper subassembly 300 extends longitudinally of the drum and parallel to the center line of the drum 20. The stripper 300 includes an elongated stripper 304 having a blade 305 supported at its upper and lower ends by respective actuators 306, 308. Each actuator 306, 308 includes a front plate 310, a rear plate 312, a side plate 314 and a base plate 316 secured to a frame member 318.

Extending between the front and rear plates 310, 312 is a double rod, piston cylinder assembly 320. The opposed rods 322, 324 are in turn secured to the rear plate 312 and the front plate 310, respectively. The stripper 304 is bolted to the cylinder 326 of the assembly 320 by flanged gussets 328 at each end of the stripper 304. Selective pressurization of either end of the cylinder 326 will result in extension of the stripper 304 towards the drum and retraction of the stripper from the drum. The travel of the piston cylinder assembly 320 is selected so that the blade 305 will be positionable at a point immediately adjacent the periphery of the drum 20 a distance less than the normal skin thickness. It is presently preferred that the stripper be actuated twice during a complete cycle of the skinning apparatus. The stripper is actuated at the beginning of the stripping operation to remove any skin which may still be present or stuck to the drum periphery. Near the completion of the stripping cycle when the clamp bars have been opened, the stripper will again be actuated to strip the hog skin from the drum and deposit it on a conveyor 332 positioned immediately below the drum (FIG. 1).

DRIVE MEANS

The main drive subassembly is best seen in FIGS. 4, 14, 16 and 17. As shown therein, the subassembly 30 includes a drive motor 350, a clutch brake 352 and a speed reducer 354. The units 350, 352 and 354 are interconnected through couplings 356 and each unit is bolted directly to skinner frame section 16. The output shaft 358 of speed reducer 354 carries a double sprocket 360. The sprocket 360 is connected to the lower double sprocket 362 of jack shaft assembly 32 by a double row chain 34. The jack shaft assembly 32 includes a shaft 364 rotatably supporting the lower sprocket 362 and an upper sprocket 366. An adjustably mounted idler sprocket 368 is positioned on a cross member 370 of the frame section 16. The sprocket is adjustable relative the chain 34 to thereby properly tension the chain.

Figure 14:
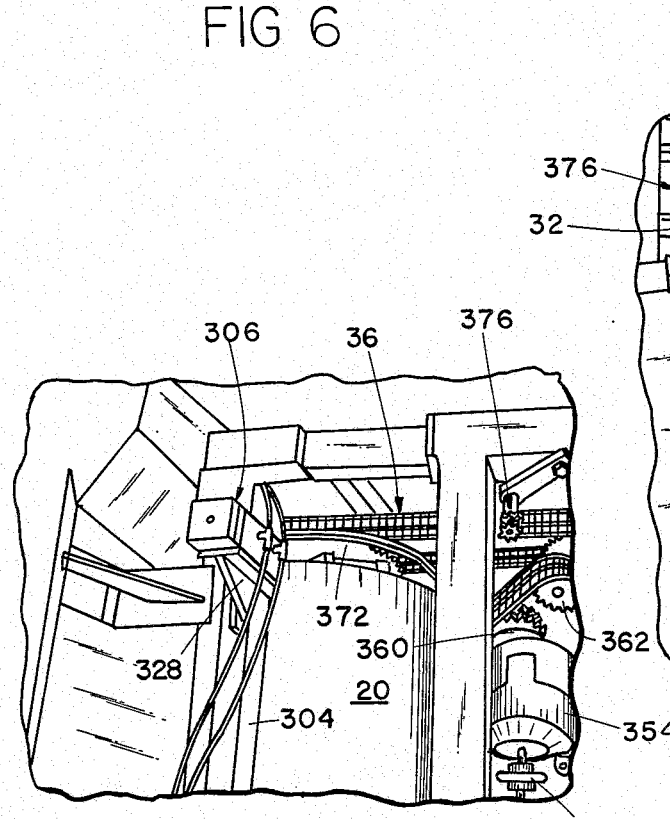
FIG. 14 is a fragmentary, right side perspective view of the skinner showing the stripper subassembly and a portion of the main drive mechanism.
Figure 17:
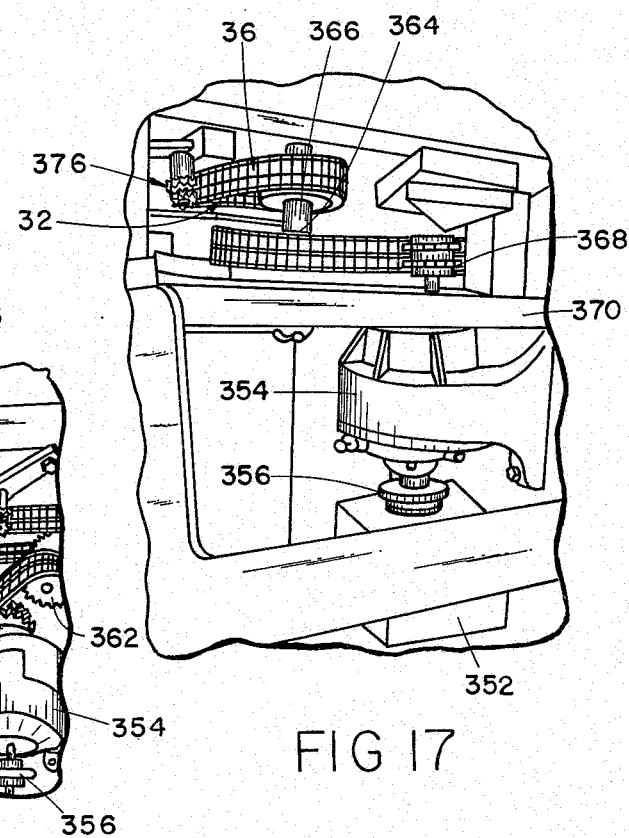
FIG. 17 is a fragmentary, rear elevational view showing the drive connection to the drum sprockets.
Figure 20:
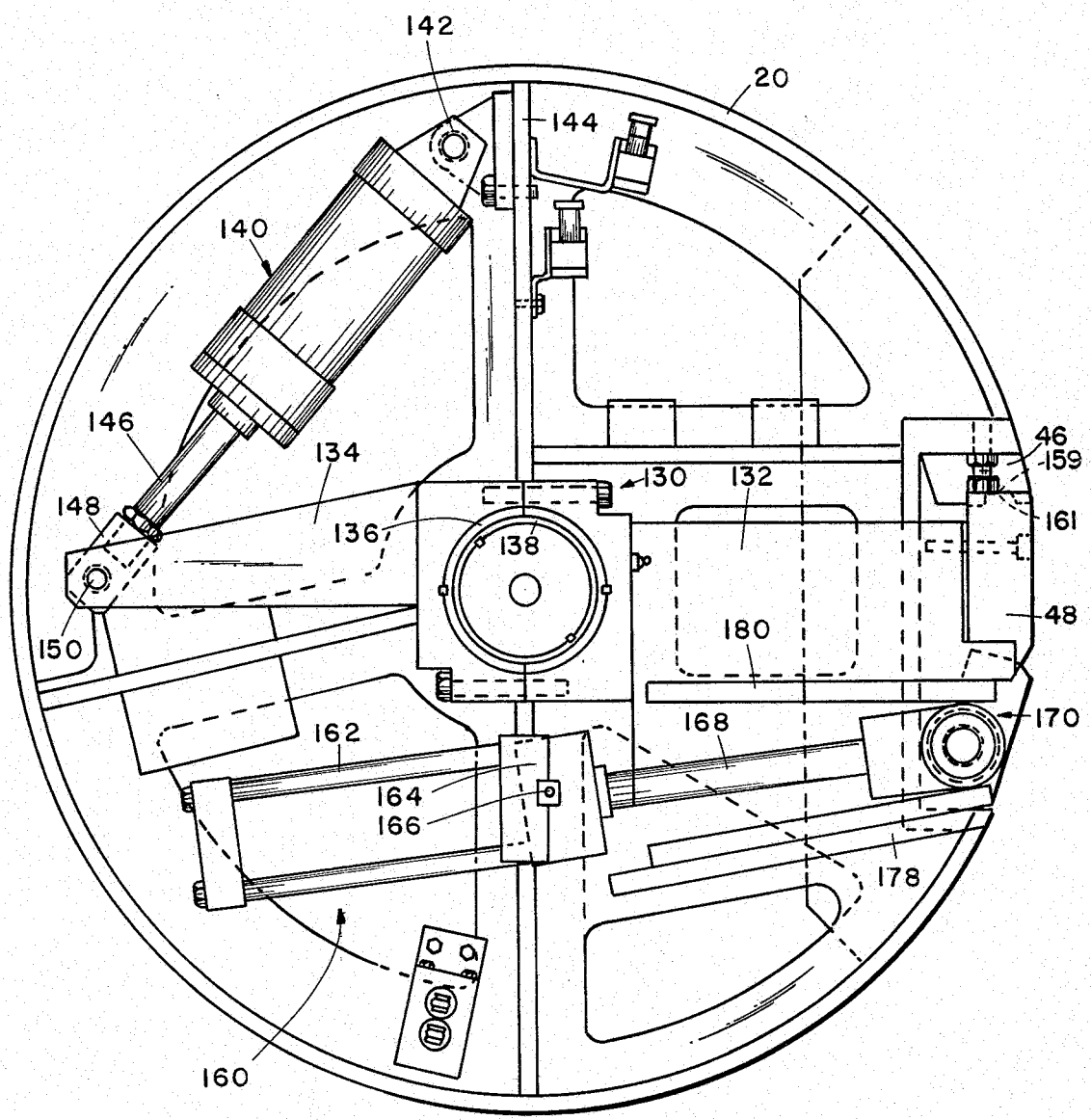
FIG. 20 is a top plan view of the drum showing the top clamp means and wedge means.
Figure 21:
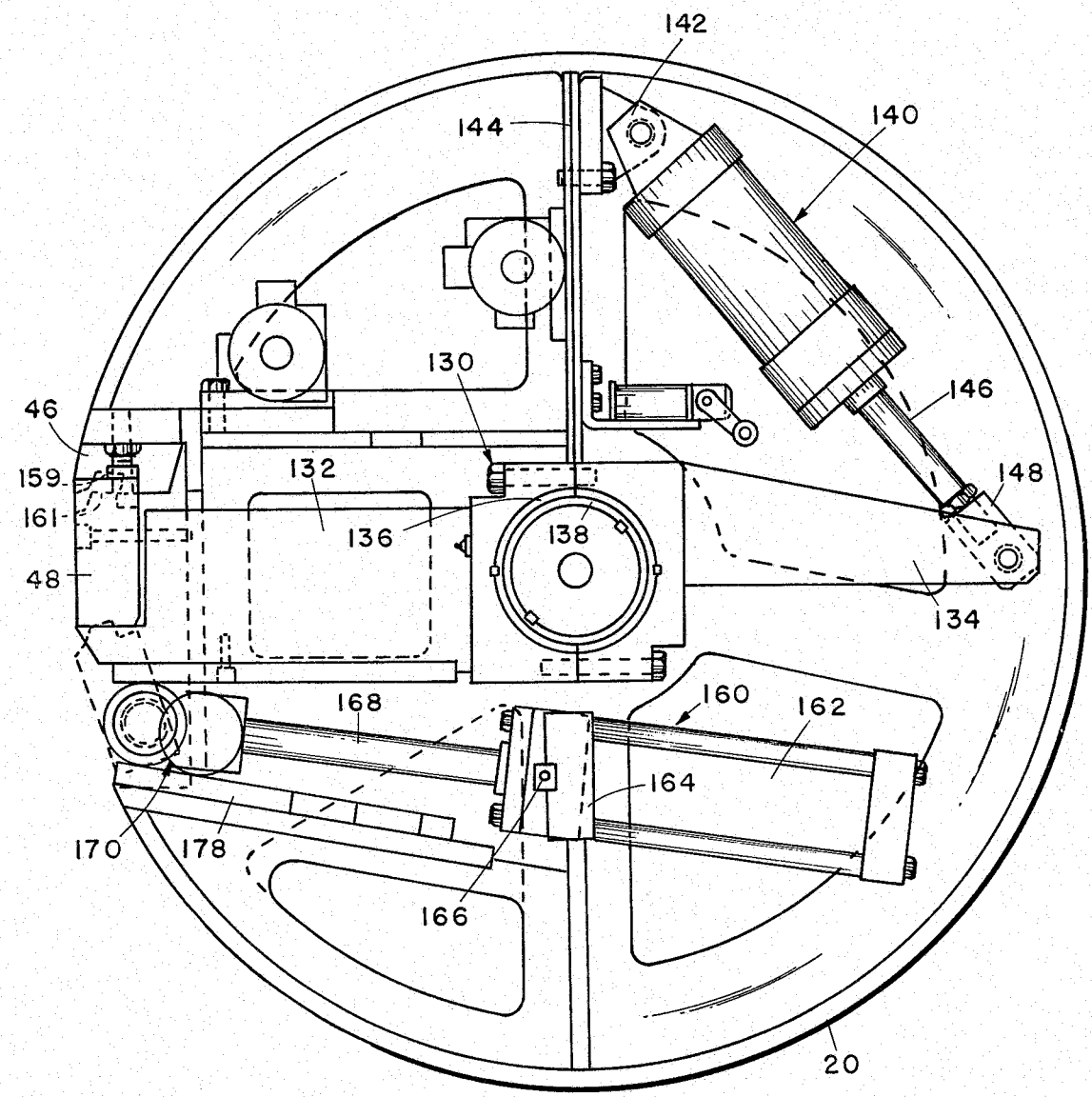
FIG. 21 is a bottom plan view of the drum showing the bottom clamp means and bottom wedge means.

As illustrated schematically in FIG. 4, and as seen in FIGS. 14, 17 and 25, a double sprocket 372 is secured to the top of the drum 20. The upper sprocket 366 of jack shaft assembly 32 is drivingly connected to the drum sprocket 372 through a double row chain 36. An adjustable idler sprocket 376 is mounted on the frame section 16 to adjust the tension of the chain 36.

It is preferred that the motor 360 be an electric motor which may be operated constantly during a "power on" condition. The air operated clutch brake 352 provides for quick transfer of power from the motor 350 through the speed reducer in the primary chain 340, the secondary chain 36, to the drum 20.

SAFETY BRAKE

As seen in FIGS. 1, 2, 3, 4, 18 and 19, a safety disc brake assembly 400 is provided to prevent rotation of the drum 20 when the apparatus is shut down. Disc brake assembly 400 includes a disc or rotor 402 nonrotatably mounted on the end of axle 22 of the drum 20. A normally on caliper subassembly 404 is mounted on the frame section 12 adjacent the rotor 402. The caliper subassembly 404 includes a base plate 406 and a pair of superimposed upper and lower brake shoe carrying flat stock or plate like springs 408, 410, respectively. Each of the brake shoe carrying flat stock springs 408, 410 supports a brake shoe 412 at its outer end. The brake shoes 412 sandwich the disc 402 therebetween. The springs 408, 410 pivot about an assembly 414. A threaded stud 416 extends through the ends of the springs 408, 410 and carries adjustment nuts 418. Rotation of the adjustment nuts 418 outwardly from the center of the stud 416 causes the springs 408, 410 to pivot inwardly at their outer ends, thereby increasing the braking pressure or force exerted on the rotor 402 by the shoes 412.

The spring 408 carries a pneumatic piston cylinder brake deactuator 420. The cylinder 422 is bolted directly to the upper surface of the spring 408 forward of the pivot assembly 414 and a piston rod 424 extends through the spring. Upon extension of the piston rod 424, the outer ends of the spring 408, 410 and therefore, the brake shoes 412, move apart, thereby releasing the rotor 402 and hence the drum 20. Should there be a failure of air pressure to the piston cylinder assembly 420, the brake will fail in the "on" position.

Figure 27:
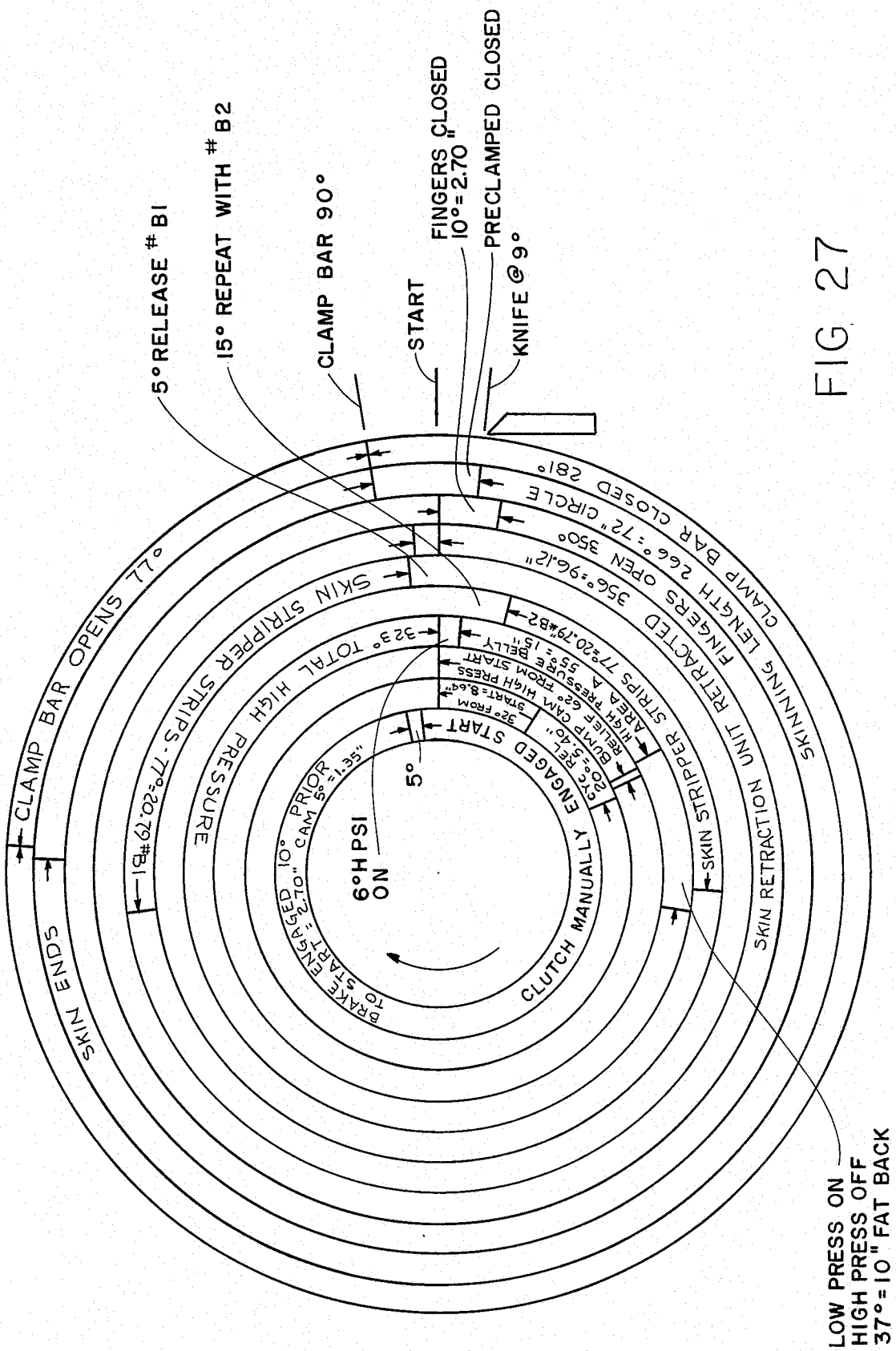
FIG. 27 is a schematic of the skinner sequence.

The sequence of operation of the drum skinner in accordance with the present invention includes the infeeding of the skin flap by the mechanisms 52, the locking of the clamp bar 48 and the commencing of rotation of the drum 20. While the drum rotates, the skin is separated from the carcass by action of the scraper blade subassembly 42. The hog carcass would rotate as the skin follows the drum around its revolution until skinning is complete. When skinning is complete, the clamp bar would open, the stripper blade would move in to remove the skin from the drum and the skin would fall onto the removal conveyor beneath the machine. The drum would continue to revolve and stop at its initial start-stop position reset for the next cycle. The duration and time of occurrence during the revolution of the drum of each of the separate operations of the subassemblies is schematically illustrated in FIG. 27.

CONTROL SYSTEM AND OPERATION

Figure 26:
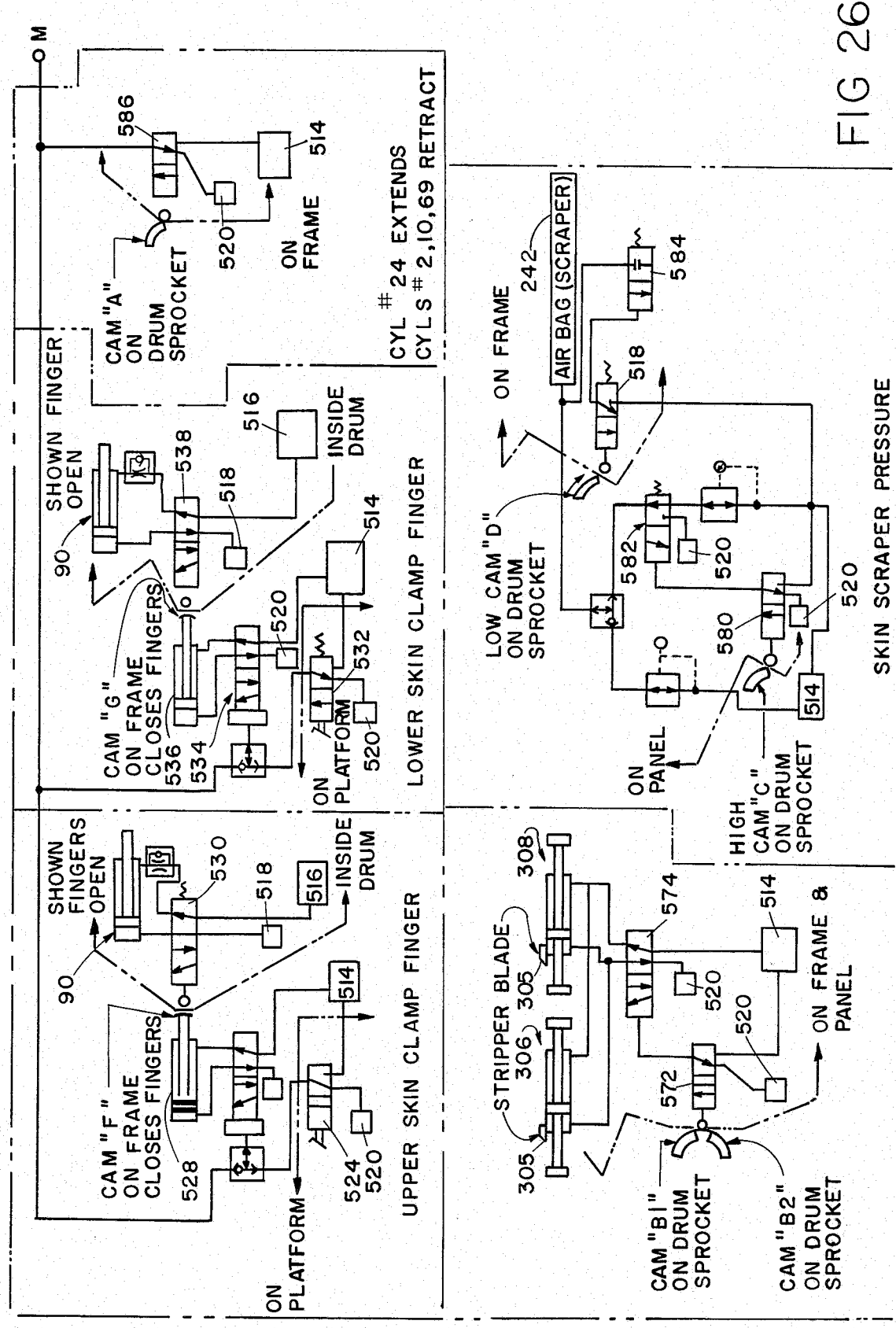
FIGS. 26a–26c are a schematic illustration of the pneumatic control system.
Figure 26C:
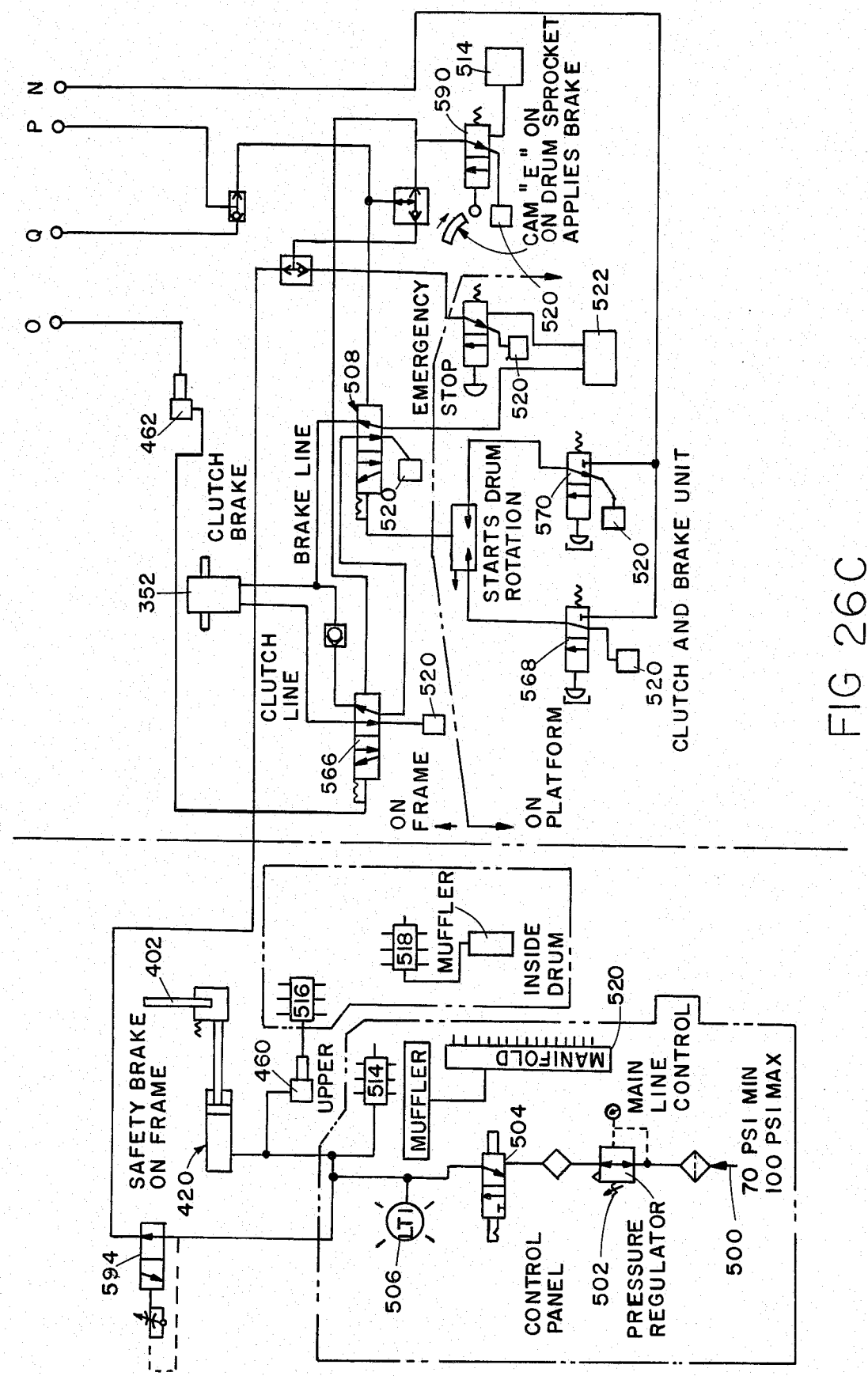

In FIGS. 24 and 25, a portion of the pneumatic control system, illustrated schematically in FIGS. 26a–26c, is shown. A plurality of cams, pneumatic valves and piston cylinder assemblies are mounted on the support frame directly above the drum, on the drum driven sprocket and within the drum itself. Portions of the control system are located on a main control panel, mounted on the frame, and also mounted within the drum itself. Compressed air is supplied to the system through rotary joints 460, 462 at the top and bottom of the drum (FIGS. 1 and 2).

With reference to FIGS. 24, 25 and 26a–26c, a source 500 supplies compressed air to the control system through a pressure regulator 502 and a main air supply valve 504. Control air is supplied to all of the valves and piston cylinder assemblies illustrated schematically by manifolds 514, 516, 518, 520 and 522. Manifolds 514, 520 and 522 are all supported on the frame or on the control counsel. Manifolds 516 and 518 are mounted within the drum. Air is supplied to the components within the drum through the upper rotary joint 460 and the lower rotary joint 462 (FIGS. 26c and 1).

In order to operate the machine, the operator first shifts the hand valve 504 which supplies air to the machine. A control light 506 will be place in an "on" condition and air will be supplied to valve 508 (FIG. 26c), and valves 510, 512 (FIG. 26b). Air is supplied to the disc brake piston cylinder 420 which releases the static or safety brake from the rotor 402. Compressed air is supplied through manifolds 514 and 516 to all of the valves and cylinders of the control system. Next, the operator turns on the electric power to the electric motor, for the clutch brake drum rotation unit and also the motor to the removal conveyor. The machine is now ready to skin a hog carcass.

A hog that is hanging from its rear hocks on a rotary hook is killed and bled and preliminary, manual trimming of the skin is performed at the rear leg area and around the head area. A slit is made longitudinally of the teat line of the hog and the skin flap is peeled back. The hog is positioned adjacent the drum skinner and against the carcass slide and abutting plate 26. The operator now places the skin flap into the upper infeeding mechanism 52 and steps on a foot valve 524 (FIG. 26a). Foot operated valve 524 shifts momentarily causing a shift in valve 526 which is an air operated valve. Cylinder 528 mounted on the upper portion of the drum skinner frame as seen in FIG. 25 extends and cam F mounted on the end of the rod of the cylinder 528 actuates valve 530. Valve 530 shifts and air flows to cylinder 90 of the upper mechanism thereby closing the gripping fingers on the skin flap. The operator then places the skin flap into the lower infeeding mechanism 52 and steps on valve 532 which shifts valve 534 causing cylinder 536 mounted on the frame to extend so that cam G contacts and actuates valve 538. The actuating piston cylinder assembly 90 of the lower infeeding mechanism 52 extends and the gripping fingers close on the lower portion flap.

Next, the operator actuates the carriage retraction and extension piston cylinder assemblies. As seen in FIG. 26b, the operator pushes on push button valve 540 which momentarily shifts, permitting air to pass to valve 542, thereby actuating piston cylinder assembly 544 which is mounted on the frame as seen in FIG. 25. Cylinder 544 retracts and valve 546 which is spring operated shifts position. As a result, valve 548 which is also spring operated shifts and cylinders 68 of the upper and lower carriage assemblies retract both skin clamp fingers into the ditch of the drum area positioning the skin for clamping. Valves 120 (FIG. 8) are shifted by actuators 122 carried by carriage plate 74. As a result, air is transmitted to valve 550 indicating that the fingers are retracted and thereby giving approval for the clamp bar to close. Air operated valve 512 shifts and air is supplied to valve 552 and 554 of the clamp bar and wedge actuating portion of the control system (FIG. 26b). The operator momentarily pushes push button valves 552, 554 which are located away from the drum for safety, and air operated valve 556 shifts, thereby extending cylinder 558 which is mounted on the frame (FIG. 25). Cam J-2 carried by the end of the stem of the piston cylinder 558 shifts valve 560 resulting is shifting of air operated valve 562. Air is now supplied to the wedge means piston cylinder assembly 162 and to the bellcrank pivoting piston cylinder assembly 140 of the clamp means. The clamp bar closes within the ditch and is wedged in place. Air operated valve 564 shifts and air operated valve 566 shifts thereby telling the clutch drum brake unit that the clamp bar is closed. Air operated valve 510 shifts and the air supply is made available to valves 568 and 570 of the clutch and brake unit (FIG. 26c). Actuation of the clutch brake which permits rotation of the drum is therefore interlocked with actuation of the wedge bar and clamp bar cylinders. The operator momentarily shifts push button valves 568, 570 and air operated valve 508 shifts, the clutch engages and the drum brake disengages in the clutch brake unit 352 and the drum starts rotation.

A system of cams mounted on top of the drum sprocket cooperates with a plurality of valves in order to automatically actuate the stripper mechanisms, supply air to the air bag of the scraper, open the infeeding fingers, release the clamp bar and stop the drum in position for the next cycle with the infeeding mechanism extended. As best seen in FIGS. 24, 25, and 26a, cam B-2 positioned on the drum sprocket actuates valve 572 momentarily. Valve 572 shifts as its actuator contacts cam B-2 and air operated valve 574 is shifted. Actuators 306, 308 of the stripper subassembly are activated thereby moving the stripper momentarily into the skin strip position. If any skin is sticking to the drum surface from the previous cycle, the stripper will remove same.

Valves 530, 538 (FIGS. 25 and 26a) run out from under cams F and G. Spring operated valves 530 and 538 shift and the cylinders 90 of the upper and lower infeeding means 52 retract and the gripping fingers open.

Cams C and D of the skin scraper pressure control system (FIGS. 24 and 26a) are positioned to contact valves 580 and 578. Cam operated valve 580 shifts and air operated valve 582 shifts, shutting off the high pressure air to the scraper air bag 242. Valve 578 actuated by cam D shifts momentarily thereby shifting air operated valve 584 and the high pressure air trapped in the pressure system is vented so that low pressure air is now placed on the scraper blade by the air bag 242. Cams C and D are positioned on the drum sprocket and dimensioned so that the high pressure air is supplied to the air bag during the initial scraping from the teat line around the hog towards the fat back area. When the scraper blade is presented with the thicker skin area around the fat back of the hog, cam D vents the air bag, thereby reducing the pressure on the scraper and thus, the scraper on the skin. It is presently preferred that the initial pressure to the air bag be approximately 50 psi and that the pressure be reduced to 0 at the fat back area. However, this can be greatly varied to suit the type and size of hog processed, and the character of the skin.

Next, cam A, part of the infeeding mechanism control system and mounted on the drum sprocket, contacts valve 586. Valve 586 shifts momentarily and air operated valve 526 shifts (FIG. 26a). Cylinder 528 retracts and is reset for the next cycle and air operated valve 534 shifts causing cylinder 536 to retract which is then reset for the next skinning cycle. Air operated valve 524 shifts, cylinder 544 extends and is reset for the next cycle and air operated valve 556 shifts resulting in cylinder 558 retracting and also being reset for the next cycle.

At this point, cam C leaves contact with valve 580 which is spring operated and causes spring operated valve 582 to shift so that high pressure air enters the air bag of the scraper (FIG. 26a). It is presently preferred that the pressure within the air bag increase from 0 at the fat back area up to about 80 psi as the rotating hog presents the belly area to the scraper.

Valve 580 leaves contact with cam J-1 (FIGS. 24, 25 and 26b). Spring operated valve 560 shifts and spring operated valve 562 shifts. Cylinders 162, 145 are supplied with air and the pistons retract, thereby retracting the wedge rollers. The male clamp bar opens and is rotated in the ditch area. Air operated valve 564 also shifts at this point. Cam B-1 then contacts valve 572 which shifts. Air operated valve 574 therefore shifts and actuators 306, 308 move the stripper into the strip position dropping the skin onto the conveyor positioned below the drum. Cam B-1 then leaves contact with valve 572 which shifts, shifting valve 574 and actuators 306, 308 retract the stripper from the strip position.

Cam E (FIG. 26c) momentarily contacts valve 590. Valve 590 shifts and detented, air operated valve 508 shifts. Air pressure is applied to the brake drum of the clutch brake assembly 352 and starts the stopping process. Air operated, detented valve 510 shifts and the push button safety is reset. Air operated, detented push button safety reset valve 512 shifts and air operated, reset clamp bar safety valve 566 shifts.

As the drum completes the stopping process, cam H contacts valve 546 (FIG. 26b) of the skin clamp retraction unit control system. Valve 546 shifts and air operated valve 548 shifts. With the clamp bar now open, air from valve 548 passes through valve 592 extending the finger carriages outward towards the operator. The carriages are shifted by cylinders 68. Spring operated valves 120 on the carriage plates shift and the clamp bar actuating control system is advised that the gripping fingers now extend through the clamp area. The machine now stops ready for the next operation with the ditch positioned for receipt of the skin flap of another hog carcass.

For machine shut-down, the main air supply valve 504 is manually shifted and air to the machine is blocked and bled. The light 506 shuts off and spring operated valve 594 shifts. Air is bled from the spring loaded caliper safety brake cylinder assembly 420 and the static or safety brake is now on. Spring return valve 548 shifts, spring return valve 592 shifts, spring return valve 562 shifts, spring return valve 550 shifts, spring return valve 574 shifts and spring return valve 582 shifts. The operator now turns off the electrical power to the machine and the unit is shut-down. After each hog carcass is skinned, the machine is momentarily blasted with hot steam and water to sanitize it, especially at the clamp region, in preparation for the next hog carcass.

The unique drum skinner in accordance with the present invention is capable of removing the skin including the hair and bristles directly from the whole hog carcass while the carcass is suspended from its rear hocks, thereby eliminating the need for dehairing or singeing and scalding steps in the processing operation. The drum skinner due to the unique scraper subassembly strips the skin without damaging the skin and without excessive removal of the fat forming bacon and residual meat products from the hog carcass. The improved clamping means and wedging means insures that the skin flap will be retained within the ditch during rotation of the drum. The retracting and infeeding means effectively places the skin flap within the ditch prior to actuation of the clamp means without wrinkling and without danger of injury to the operator. In view of the above description, those of ordinary skill in the pertinent art will undoubtedly envision various modifications to the apparatus disclosed which would not depart from the inventive concepts disclosed herein. For example, the acute angle of the drum relative to vertical may be varied to insure proper positioning of the hog carcass but without excessive resistance to rotation of the hog carcass. The carcass must rotate relatively freely to avoid tearing of the skin. More or less skin flap infeeding means could be employed, although two are presently preferred. Therefore, it is expressly intended that the above description should be considered as that of the preferred embodiment and the true spirit and scope of the present invention will be determined by reference to the appended claims.

The embodiments of the invention in which an exclusive property or privilege is claimed are defined as follows.

1. Hog carcass skinning apparatus for removing the skin with retained hair directly from a hog carcass, comprising:
   a carcass-abutting and slide surface;
   a drum rotatably mounted adjacent said carcass-abutting and slide surface, said drum having an axially orientated ditch opening through its periphery;
   clamping means on said drum at said ditch for clamping an edge flap of skin on the hog carcass;
   a skin scraper positioned adjacent said ditch;
   extensible-retractable skin flap gripping and infeeding means in said ditch extensible out of said ditch and retractable into said ditch for gripping and infeeding the edge flap into said ditch to allow clamping thereof whereby upon an edge flap of skin being gripped and pulled into said ditch and clamped, rotation of said drum through a revolution causes the carcass to rotate on said abutting and slide surface and the skin to be scraped off the carcass by said scraper.

2. The apparatus as defined by claim 1 further including another skin flap gripping and infeeding means spaced longitudinally from said gripping and infeeding means in said ditch and wherein each of said gripping and infeeding means comprises:
   at least one pair of cooperable gripping fingers;
   means for opening and closing said gripping fingers; and
   extension and retraction means connected to said gripping fingers for extending said fingers when open and retracting said fingers into said ditch when closed.

3. The apparatus in claim 1 wherein said clamping means includes a fixed jaw in said ditch; a cooperative shiftable jaw in said ditch shiftable between an open position spaced from said fixed jaw to a closed position at said fixed jaw; power means to shift said shiftable jaw between said portions; wedging means within the periphery of said drum, movable radially outwardly relative to said drum for operation against said shiftable jaw to lock a skin flap between said jaws; and power means for operating said wedging means.

4. The apparatus in claim 3 wherein said fixed jaw is on one side of said ditch, and said wedging means includes wedging rollers shiftable into engagement between a fixed support at the opposite side of said ditch and said shiftable jaw.

5. The apparatus in claim 1 including a mount for said scraper, said mount being movable with respect to said drum periphery for varying the spacing between said scraper and said drum periphery; and pneumatic biasing means engaging said mount for biasing said scraper a predetermined amount relative to said drum periphery.

6. The apparatus in claim 5 wherein said pneumatic biasing means comprises an inflated tubular member.

7. The apparatus in claim 6 including pneumatic pressure control means associated with said inflated tubular member for controlling the pressure therein.

8. The apparatus in claim 7 including means connected to said pressure control means and operable with rotation of said drum for controllably varying the pressure in said member, and thus the bias applied to said scraper, with the rotational position of said drum.

9. Hog carcass skinning apparatus for removing the skin with retained hair directly from a hog carcass, comprising: a generally vertically oriented, carcass-abutting and slide surface; said carcass-abutting and slide surface forming a vertical slot; a generally vertically, oriented rotational drum adjacent said carcass-abutting and slide surface at said slot; said drum having an axially oriented ditch in its periphery, and clamping means in said ditch for clamping an edge flap of skin on the hog carcass; said ditch and clamping means being movable from a position aligned with said slot, through a revolution of said drum, back to said position; a skin scraper along said slot; said clamping means including a fixed jaw in said ditch; a cooperative shiftable jaw in said ditch shiftable between an open position spaced from said fixed jaw to a closed position at said fixed jaw; power means to shift said shiftable jaw between said positions; wedging means within the periphery of said drum movable radially outwardly relative to said drum for operation against said shiftable jaw to lock a skin flap between said jaws; and power means for operating said wedging means whereby, rotation of said drum through a revolution, with a clamped edge flap of skin of a hog carcass in said ditch, causes the hog carcass to rotate on said abutting and slide surface while the skin is scraped off the carcass by said scraper.

10. The apparatus in claim 9 wherein said fixed jaw is on one side of said ditch, and said wedging means includes wedging rollers shiftable into engagement between a fixed support at the opposite side of said ditch and said shiftable jaw.

11. Hog carcass skinning apparatus for removing the skin with retained hair directly from a hog carcass, comprising: a generally vertically oriented carcass-abutting and slide surface; said carcass-abutting and slide surface forming a vertical slot; a generally vertically oriented, rotational drum adjacent said carcass-abutting and slide surface at said slot; said drum having an axially oriented ditch in its periphery, and clamping means in said ditch for clamping an edge flap of skin on the hog carcass; said ditch and clamping means being movable from a position aligned with said slot, through a revolution of said drum, back to said position; a floating skin scraper along said slot; a mount for said scraper, said mount being movable with respect to said drum periphery for varying the spacing between said scraper and said drum periphery; and controllably variable biasing means engaging said mount for variably biasing said floating skin scraper in controlled predetermined amounts relative to said drum periphery as said drum is rotated during skinning.

12. The apparatus as defined in claim 11 wherein said controllably variable biasing means includes control means for initially setting the bias at a first predetermined amount, reducing the bias to a second predetermined amount after the drum rotates a predetermined angle during skinning and then increasing the bias to a third predetermined amount.

13. The apparatus as defined in claim 12 wherein said biasing means includes an inflatable member engaging said mount and wherein said control means comprises a controlled source of fluid operatively connected to said inflatable member for varying the pressure within said member to thereby control the bias of said floating skin scraper in a controlled manner.

14. The apparatus as defined in claim 13 wherein said controlled source of fluid reduces the bias to said second, predetermined value when said drum has rotated to present the fat back area of the carcass to the floating skin scraper.

15. A hog carcass skinning apparatus comprising:
a support frame;
a drum rotatably mounted on said support frame in a position angled slightly from vertical, said drum having a ditch extending longitudinally along and opening through the peripheral surface thereof;
skin flap retracting means mounted within said drum at said ditch for gripping a skin flap on the carcass and for retracting the skin flap into said drum ditch;
skin clamping means positioned at said ditch for clamping the skin flap to the drum at said ditch after said skin flap is retracted by said retracting means;
a skin scraper floatably mounted on said frame adjacent said ditch and spaced from the periphery of said drum from separating the skin from said carcass as said drum rotates.

16. A hog carcass skinning apparatus as defined by claim 15 further including a stripper means supported on said frame and shiftable from an inoperative position to an operative position closely adjacent the periphery of said drum for stripping the skin from the drum as said drum rotates.

17. A hog carcass skinning apparatus as defined by claim 15 wherein said skin flap retracting means comprises:
a carriage slidably mounted within said drum adjacent said ditch;
a first gripping finger positioned on said carriage;
a second gripping finger pivotally mounted on said carriage for movement towards and away from said first finger.

18. A hog carcass skinning apparatus as defined by claim 17 wherein said skin flap retaining means further includes carriage power means for shifting said carriage from a first position wherein said fingers extend radially outwardly from ditch to a second position wherein said fingers are retracted within said ditch.

19. A hog carcass skinning apparatus as defined by claim 18 wherein said skin flap retaining means further includes:
finger pivoting means for pivoting said second finger away from said first finger when said carriage power means shifts said carriage to said first position and pivoting said second finger towards said first finger to thereby grip said skin flap when said carriage is in said first position.

20. A hog carcass skinning apparatus as defined by claim 15 wherein said skin clamping means comprises:
a female clamp bar extending longitudinally of and defining one side of said ditch;
a male clamp bar;
shifting means for shifting said male clamp bar from a first position out of said ditch to a second position against said female clamp bar.

21. A hog carcass skinning apparatus as defined by claim 20 wherein said skin clamping means further comprises:
wedging means within said drum for wedging said male clamp bar against said female clamp bar after actuation of said shifting means.

22. A hog carcass skinning apparatus as defined by claim 21 wherein said shifting means comprises:
a bellcrank pivotally mounted within said drum about the longitudinal axis of said drum, said bellcrank having a wedge bar arm and a clamp bar arm, said male clamp bar secured to the end of said wedge bar arm; and
actuating means mounted within said drum and operatively engaging the end of said clamp bar arm for rotating said bellcrank and thereby shifting said male clamp bar between said first and second positions.

23. A hog carcass skinning apparatus as defined by claim 22 wherein said wedging means comprises:
a piston/cylinder power actuator pivotally mounted within said drum;
a roller mounted on the stem of said piston;
a camming plate positioned within said drum and spaced from said wedge bar arm; and
control means responsive to shifting of said male clamp bar to said second position for actuating said power actuator and moving said roller along said camming plate and against the lateral edge of said wedge arm to thereby wedge said male clamp bar against said female clamp bar.

24. A hog carcass skinning apparatus as defined by claim 19 wherein said skin clamping means comprises:
a female clamp bar extending longitudinally of anddefining one side of said ditch;
a male clamp bar;
shifting means for shifting said male clamp bar from a first position out of said ditch to a second position against said female clamp bar.

25. A hog carcass skinning apparatus as defined by claim 24 wherein said skin clamping means further comprises:
wedging means within said drum for wedging said male clamp bar against said female clamp bar after actuation of said shifting means.

26. A hog carcass skinning apparatus as defined by claim 24 wherein said shifting means comprises:
a bellcrank pivotally mounted within said drum about the longitudinal axis of said drum, said bellcrank having a wedge bar arm and a clamp bar arm, said male clamp bar secured to the end of said wedge bar arm; and
actuating means mounted within said drum and operatively engaging the end of said clamp bar arm for pivoting said bellcrank and thereby shifting said male clamp bar between said first and second portions.

27. A hog carcass skinning apparatus as defined by claim 26 wherein said wedging means comprises:
a piston/cylinder power actuator pivotally mounted within said drum;
a roller mounted on the stem of said piston;
a camming plate positioned within said drum and spaced from said wedge bar arm; and
control means responsive to shifting of said male clamp bar to said second position for actuating said power actuator and moving said roller along said camming plate and against the lateral edge of said wedge arm to thereby wedge said male clamp bar against said female clamp bar.

28. A hog carcass skinning apparatus as defined by claim 27 further including another skin flap retracting means mounted within said drum and spaced from said skin flap retracting means at said ditch.

29. A hog carcass skinning apparatus as defined by claim 15 wherein said skin scraper comprises:
an elongated scraper blade holder pivotally secured to said frame;
pressure means disposed between said scraper blade holder and said frame for biasing said scraper blade holder to a position spaced from said drum.

30. A hog carcass skinning apparatus as defined by claim 29 wherein said pressure means comprises:
an inflatable, elongated tubular member;
control means operatively connected to said tubular member and including a controlled source of pressurized air for varying the pressure within said tubular member as a function of drum position during rotation of said drum.

31. A hog carcass skinning apparatus as defined by claim 28 wherein said skin scraper comprises:
an elongated scraper blade holder pivotally secured to said frame;
resilient means disposed between said scraper blade holder and said frame for biasing said scraper blade holder to a position spaced from said drum.

32. A hog carcass skinning apparatus as defined by claim 31 wherein said resilient means comprises:
an inflatable, elongated tubular member;
control means operatively connected to said tubular member and including a controlled source of pressurized air for varying the pressure within said tubular member as a function of drum position during rotation of said drum.

33. A hog carcass skinning apparatus as defined by claim 30 further including power drive means mounted on said frame and operatively connected to said drum for rotating said drum.

34. A hog carcass skinning apparatus as defined by claim 33 further including brake means mounted in part on said drum for selectively braking and stopping the rotation of said drum.

35. A hog carcass skinning apparatus as defined by claim 34 wherein said brake means comprises:
a disc nonrotatably secured to the drum and coaxially aligned therewith;
a bracket secured to said frame;
a pair of opposed brake shoes carried by said bracket and positioned to engage opposite faces of said disc;
resilient means for biasing said shoes into contact with said drum; and
brake release means carried by said bracket for moving said shoes out of engagement with said disc upon actuation of said drive means.

36. A hog carcass skinning apparatus as defined by claim 16 wherein said stripper means comprises:

an elongated stripper bar;

a pair of stripper actuators supported by said frame in spaced relationship, said stripper bar extending between said actuators, each of said actuators comprising:

a pair of spaced plates;

a double rod power cylinder disposed between said plates, one rod connected to one of said plates and the other rod connected to the other of said plates, said cylinder extending radially from said drum, the ends of said stripper bar connected to a respective one of said cylinders; and stripper control means operatively connected to each of said cylinders for selectively activating said cylinders and moving said bar towards and away from said drum to thereby remove the skin from said drum.

37. A hog carcass skinning apparatus as defined by claim 35 further including a stripper means supported on said frame and shiftable from an inoperative position to an operative position closely adjacent the periphery of said drum for stripping the skin from the drum as said drum rotates, said stripper means comprising:

an elongated stripper bar;

a pair of stripper actuators supported by said frame in spaced relationship, said stripper bar extending between said actuators, each of said actuators, comprising:

a pair of spaced plates;

a double rod air cylinder disposed between said plates, one rod connected to one of said plates and the other rod connected to the other of said plates, the ends of said cylinder extending radially from said drum, the ends of said stripper bar connected to a respective one of said cylinders; and stripper control means operatively connected to each of said cylinders for selectively activating said cylinders and moving said bar towards and away from said drum to thereby remove the skin from said drum.

38. An improved hog carcass skinning apparatus for removing the skin with retained hair directly from a hog carcass, said apparatus being of the type including a generally vertically positioned drum having an axially orientated ditch opening through its periphery and clamping means for clamping an edge flap of skin on the hog carcass and a skin scraper positioned adjacent said ditch, wherein the improvement comprises:

at least one extensible and retractable skin flap gripping and infeeding means spaced in said ditch for gripping and infeeding the edge flap of skin into said ditch to allow clamping thereof without wrinkling of said edge flap of skin.

39. An improved hog carcass skinning apparatus as defined by claim 38 wherein said gripping and infeeding means comprises:

an extensible and retractable carriage mounted within said drum;

a pair of cooperable gripping fingers of frangible material carried by said carriage;

means connected to said carriage for extending and retracting said carriage so that said fingers are positionable extended from and retracted into said ditch; and means on said carriage for opening and closing said fingers for gripping and releasing said skin flap.

40. An improved hog carcass skinning apparatus as defined by claim 38 wherein said clamping means comprises:

a female clamp bar having an elongated channel positioned within said ditch and defining a side wall of said ditch;

a pivotally mounted male clamp bar positioned adjacent said ditch; and power means for pivoting said male clamp bar into engagement with said female clamp bar; and wedging means extensible radially within said drum for locking said male clamp bar against said female clamp bar.

41. An improved hog carcass skinning apparatus as defined by claim 38 further including:

an air bag engaging said scraper for biasing said scraper towards said drum periphery.

42. An improved hog carcass skinning apparatus as defined by claim 41 further including:

pressurizing means connected to said air bag for varying the pressure within said air bag during rotation of said drum.

43. An improved hog carcass skinning apparatus as defined by claim 42 wherein said gripping and infeeding means comprises:

an extensible and retractable carriage mounted within said drum;

a pair of cooperable gripping fingers of frangible material carried by said carriage;

means connected to said carriage for extending and retracting said carriage so that said fingers are positionable extended from and retracted into said ditch; and means on said carriage for opening and closing said fingers for gripping and releasing said skin flap.

44. An improved hog carcass skinning apparatus as defined by claim 43 wherein said clamping means comprises:

a female clamp bar having an elongated channel positioned within said ditch and defining a side wall of said ditch;

a pivotally mounted male clamp bar positioned adjacent said ditch;

power means for pivoting said male clamp bar into engagement with said female clamp bar; and wedging means extensible radially within said drum for locking said male clamp bar against said female clamp bar.

45. A method of removing the skin with retained hair directly from a hog carcass comprising the steps of:

suspending a hog by its rear hocks from a conveyor so that said hog may rotate;

killing and bleeding the hog;

manually removing some of the skin from the carcass at the rear hock and head areas;

slitting the skin of the carcass along the teat strip to provide a skin flap;

placing the edge of the skin flap in a skin flap gripping and infeeding means;

retracting the infeeding means into a longitudinal ditch opening through the periphery of a skinning drum;

clamping the skin flap within the drum;

rotating the drum; and scraping the skin from the hog carcass as the skin is pulled around the drum and the hog carcass rotates.

46. A method as defined by claim 45 wherein said scraping step includes the steps of providing an elongated scraper adjacent the periphery of the drum;
   pivoting the scraper towards and away from the drum as the carcass rotates; and
   variably biasing the scraper towards the drum as said carcass rotates.

47. A method as defined by claim 46 wherein said biasing step includes:
   placing an air bag in engagement with said scraper; and
   varying the pressure within the air bag as the drum rotates.

48. A method as defined by claim 47 including the step of:
   stripping the skin from the drum at the completion of the skinning operation.

49. A method as defined by claim 45 wherein said clamping step includes the step of providing a clamping bar pivotable into said ditch to clamp said skin flap.

50. A method as defined by claim 49 further including the step of wedging said clamping bar into said ditch to securely retain the skin flap and lock said clamping bar.

51. A method as defined by claim 47 wherein said pressure varying step includes:
   initially pressurizing said air bag;
   decreasing the pressure within said air bag to about zero as the fat back area of the carcass is presented to the scraper and then re-pressurizing said air bag.

52. A method as defined by claim 51 wherein said clamping step includes the step of providing a clamping bar rotatable into said ditch to clamp said skin flap.

53. A method as defined by claim 52 further including the step of wedging said clamping bar into said ditch to securely retain the skin flap and lock said clamping bar.

54. An improved hog carcass skinning apparatus for removing the skin with retained hair directly from a hog carcass which has been preliminarily prepared by slitting the skin of the carcass along the teat strip to provide a skin flap, said apparatus being of the type including a support frame, a drum rotatably mounted on the support frame in a position angled slightly from vertical, the drum having a ditch extending longitudinally along and opening through the peripheral surface thereof; and skin clamping means positioned at said ditch for clamping the skin flap to the drum at the ditch wherein the improvement comprises:
   a skin scraper adjustably mounted on said frame and movable towards and away from the drum for exerting a pressure on the skin, holding the skin against the drum and scraping the skin from the hog carcass as the skin is pulled around the drum and the hog carcass rotates; and
   means operatively engaging said skin scraper for varying the pressure of said skin scraper against said skin in a controlled manner and for varying the position of said scraper relative to said drum in a predetermined, controlled manner during skinning.

55. An improved carcass skinning apparatus as defined by claim 54 wherein said skin scraper has a blunt edge contacting said skin.

56. An improved carcass skinning apparatus as defined by claim 55 wherein said means operatively engaging said skin scraper includes a resilient member and means for varying the resilience of said member during scraping of said skin.

57. An improved carcass skinning apparatus as defined by claim 56 wherein said means for varying the resilience of said resilient member varies the resilience from a first predetermined value wherein the scraper is close to said drum to a second predetermined value wherein said scraper is away from the drum and finally to a third predetermined value wherein the scraper is again close to said drum, said second predetermined value being less than said first predetermined value and said third predetermined value being greater than said second predetermined value.

58. An improved carcass skinning apparatus as defined by claim 57 wherein said resilient member comprises an elongated, inflatable hose.

59. An improved carcass skinning apparatus as defined by claim 58 wherein said means for varying the resilience of said hose comprises a controlled source of pressurized fluid for varying the pressure within said hose from said first predetermined value to said second predetermined value and finally to said third predetermined value.

60. Hog carcass skinning apparatus for removing the skin with retained hair directly from a hog carcass, comprising:
   a carcass-abutting and slide surface;
   a generally vertical drum rotatably mounted adjacent said carcass-abutting and slide surface, said drum having an axially orientated ditch opening through its periphery;
   clamping means on said drum at said ditch for clamping an edge flap of skin on the hog carcass so that upon rotation of said drum said hog carcass will rotate;
   a skin scraper positioned adjacent said ditch for scraping the skin of the carcass, said scraper being mounted for angular movement radially toward and away from said drum during skinning;
   pressure means operatively engaging said scraper for exerting a pressure on said scraper during rotation of said drum and during skinning; and
   control means connected to said pressure means for varying the pressure exerted by said pressure means on said scraper during rotation of said drum and said hog carcass so that the pressure exerted on the skin by the scraper and the angle of the scraper relative to the drum varies as a function of drum and hog carcass position.

61. Hog carcass skinning apparatus as defined by claim 60 wherein said pressure means comprises an inflatable member.

62. Hog carcass skinning apparatus as defined by claim 61 wherein said control means includes a source of pressurized fluid connected to said inflatable member and means for increasing the pressure within said tubular member from a first value at the start of drum rotation to a second value, lower than said first value when the fat back area of the hog carcass is presented to said scraper and finally to a third value greater than second value during completion of skinning of the hog carcass.

* * * * *

UNITED STATES PATENT AND TRADEMARK OFFICE
CERTIFICATE OF CORRECTION

PATENT NO. : 4,084,292
DATED : April 18, 1978
INVENTOR(S) : Martin L. Harlan et al It is certified that error appears in the above-identified patent and that said Letters Patent are hereby corrected as shown below:

Column 1, line 61:
"of" should be --for--.

Column 11, line 45:
"portion flap." should be --portion of the skin flap.--

Column 16, line 37:
"from" (first occurrence) should be --for--

Column 17, lines 43 and 44:
"anddefining" should be --and defining--

Column 22, line 61:
"than second" should be --than said second--

Signed and Sealed this

Fifth Day of December 1978

[SEAL]

Attest:

RUTH C. MASON
Attesting Officer

DONALD W. BANNER
Commissioner of Patents and Trademarks